United States Patent
Tseng et al.

(10) Patent No.: US 12,399,622 B2
(45) Date of Patent: Aug. 26, 2025

(54) HIGH-LEVEL ARCHITECTURE FOR 3D-NAND BASED IN-MEMORY SEARCH

(71) Applicant: MACRONIX INTERNATIONAL CO., LTD., Hsinchu (TW)

(72) Inventors: Po-Hao Tseng, Taichung (TW); Ming-Hsiu Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 148 days.

(21) Appl. No.: 18/378,960

(22) Filed: Oct. 11, 2023

(65) Prior Publication Data

US 2025/0123750 A1  Apr. 17, 2025

(51) Int. Cl.
*G06F 3/06* (2006.01)

(52) U.S. Cl.
CPC .......... *G06F 3/0613* (2013.01); *G06F 3/0656* (2013.01); *G06F 3/0679* (2013.01)

(58) Field of Classification Search
CPC ..... G06F 3/0613; G06F 3/0656; G06F 3/0679
USPC ............................................. 365/49.17, 205
See application file for complete search history.

(56) References Cited

U.S. PATENT DOCUMENTS

| | | | |
|---|---|---|---|
| 6,317,349 B1 | 11/2001 | Wong | |
| 7,050,317 B1 | 5/2006 | Lien et al. | |
| 2001/0026464 A1* | 10/2001 | Hata | G11C 15/00 365/49.1 |
| 2003/0225984 A1* | 12/2003 | Ogura | G11C 7/1006 711/128 |
| 2014/0207619 A1* | 7/2014 | Ishebabi | G06Q 30/0623 705/26.61 |
| 2015/0242433 A1* | 8/2015 | Itani | H03M 7/3086 707/693 |
| 2022/0108748 A1 | 4/2022 | Tseng et al. | |
| 2022/0366988 A1* | 11/2022 | Tseng | G11C 15/04 |
| 2023/0036141 A1 | 2/2023 | Tseng et al. | |
| 2023/0063076 A1 | 3/2023 | Choi | |
| 2023/0238061 A1 | 7/2023 | Lin et al. | |
| 2023/0395148 A1 | 12/2023 | Tseng | |

OTHER PUBLICATIONS

U.S. Appl. No. 18/760,123 "Memory Device and Memory System", filed Jul. 1, 2024, 71 pages.

(Continued)

*Primary Examiner* — Michael T Tran
(74) *Attorney, Agent, or Firm* — Korbin S Van Dyke; Haynes Beffel & Wolfeld LLP

(57) ABSTRACT

A high-level architecture for 3D-NAND based in-memory search provides for receiving searches for application to select lines and word lines of a non-volatile 3D memory array. A search word is presented to a 3D-NAND memory along a direction of a bit line of the 3D-NAND memory. Each character of the word comprises a number of digits. Each digit is matched against respective layers of the 3D-NAND memory. Each digit is usable to represent one of a plurality of levels according to a selected encoding. Optionally, various lengths of words are accommodated via serial and/or parallel operations of one or more 3D-NAND memories.

20 Claims, 26 Drawing Sheets

| Search Input | WL | WL' |
|---|---|---|
| "0" | V0 | V7 |
| "1" | V1 | V6 |
| "2" | V2 | V5 |
| "3" | V3 | V4 |
| "4" | V4 | V3 |
| "5" | V5 | V2 |
| "6" | V6 | V1 |
| "7" | V7 | V0 |
| Wildcard | V0 | V0 |
| Invalid | V8 | V8 |

| Stored Data | FG | FG' |
|---|---|---|
| "0" | Vt 0 | Vt 7 |
| "1" | Vt 1 | Vt 6 |
| "2" | Vt 2 | Vt 5 |
| "3" | Vt 3 | Vt 4 |
| "4" | Vt 4 | Vt 3 |
| "5" | Vt 5 | Vt 2 |
| "6" | Vt 6 | Vt 1 |
| "7" | Vt 7 | Vt 0 |
| Don't Care | Vt 7 | Vt 7 |
| Invalid | Vt 0 | Vt 0 |

(56) References Cited

OTHER PUBLICATIONS

Tseng et al., "In-Memory Approximate Computing Architecture Based on 3D-NAND Flash Memories," 2022 IEEE Symposium on VLSI Technology and Circuits (VLSI Technology and Circuits), Honolulu, HI, USA, Jun. 12-17, 2022, pp. 270-271.

Tseng et al., "In-Memory-Searching Architecture Based on 3D-NAND Technology with Ultra-high Parallelism," 2020 IEEE International Electron Devices Meeting (IEDM), San Francisco, CA, USA, Dec. 12-18, 2020, pp. 36.1.1-36.1.4.

* cited by examiner

| Search Input | WL | WL' |
|---|---|---|
| "0" | VL | VH |
| "1" | VH | VL |
| Wildcard | VL | VL |
| Invalid | VH | VH |

| Stored Data | FG | FG' |
|---|---|---|
| "0" | LVT | HVT |
| "1" | HVT | LVT |
| Don't Care | HVT | HVT |
| Invalid | LVT | LVT |

| Search Input | WL | WL' |
|---|---|---|
| "0" | V0 | V7 |
| "1" | V1 | V6 |
| "2" | V2 | V5 |
| "3" | V3 | V4 |
| "4" | V4 | V3 |
| "5" | V5 | V2 |
| "6" | V6 | V1 |
| "7" | V7 | V0 |
| Wildcard | V0 | V0 |
| Invalid | V8 | V8 |

| Stored Data | FG | FG' |
|---|---|---|
| "0" | Vt 0 | Vt 7 |
| "1" | Vt 1 | Vt 6 |
| "2" | Vt 2 | Vt 5 |
| "3" | Vt 3 | Vt 4 |
| "4" | Vt 4 | Vt 3 |
| "5" | Vt 5 | Vt 2 |
| "6" | Vt 6 | Vt 1 |
| "7" | Vt 7 | Vt 0 |
| Don't Care | Vt 7 | Vt 7 |
| Invalid | Vt 0 | Vt 0 |

| | Invalid | I8+I1 | I7+I2 | I6+I3 | I5+I4 | I4+I5 | I3+I6 | I2+I7 | I1+I8 | I1+I1 |
|---|---|---|---|---|---|---|---|---|---|---|
| | Wild card | Ioff | Ioff | Ioff | Ioff | Ioff | Ioff | Ioff | Ioff | Ioff |
| | Input 7 | I7 | I6 | I5 | I4 | I3 | I2 | I1 | Ioff | Ioff |
| | Input 6 | I6 | I5 | I4 | I3 | I2 | I1 | Ioff | I1 | Ioff |
| | Input 5 | I5 | I4 | I3 | I2 | I1 | Ioff | I1 | I2 | Ioff |
| | Input 4 | I4 | I3 | I2 | I1 | Ioff | I1 | I2 | I3 | Ioff |
| | Input 3 | I3 | I2 | I1 | Ioff | I1 | I2 | I3 | I4 | Ioff |
| | Input 2 | I2 | I1 | Ioff | I1 | I2 | I3 | I4 | I5 | Ioff |
| | Input 1 | I1 | Ioff | I1 | I2 | I3 | I4 | I5 | I6 | Ioff |
| | Input 0 | Ioff | I1 | I2 | I3 | I4 | I5 | I6 | I7 | Ioff |
| | Stored 0 | Stored 1 | Stored 2 | Stored 3 | Stored 4 | Stored 5 | Stored 6 | Stored 7 | Stored Don't Care |

FIG. 16C

| Search Input | WL | WL' | Stored Data | FG | FG' |
|---|---|---|---|---|---|
| "0" | V0 | Vp | "0" | Vt 0 | Vt p |
| "1" | V1 | Vp-1 | "1" | Vt 1 | Vt p-1 |
| "2" | V2 | Vp-2 | "2" | Vt 2 | Vt p-2 |
| "3" | V3 | Vp-3 | "3" | Vt 3 | Vt p-3 |
| → | → | → | → | → | → |
| "p-2" | Vp-2 | V2 | "p-2" | Vt p-2 | Vt 2 |
| "p-1" | Vp-1 | V1 | "p-1" | Vt p-1 | Vt 1 |
| "p" | Vp | V0 | "p" | Vt p | Vt 0 |
| Wildcard | V0 | V0 | Don't Care | Vt p | Vt p |
| Invalid | Vp+1 | Vp+1 | Invalid | Vt 0 | Vt 0 |

| Search Data | WL | WL' |
|---|---|---|
| "0" | VL | VH |
| "1" | VH | VL |
| Wildcard | VH | VH |
| Invalid | VL | VL |

| Stored Data | FG | FG' |
|---|---|---|
| "0" | LVT | HVT |
| "1" | HVT | LVT |
| Don't Care | LVT | LVT |
| Invalid | HVT | HVT |

| Search Input | WL | WL' |
|---|---|---|
| "0" | V7 | V0 |
| "1" | V6 | V1 |
| "2" | V5 | V2 |
| "3" | V4 | V3 |
| "4" | V3 | V4 |
| "5" | V2 | V5 |
| "6" | V1 | V6 |
| "7" | V0 | V7 |
| Wildcard | V7 | V0 |

| Stored Data | FG | FG' |
|---|---|---|
| "0" | Vt 0 | Vt 7 |
| "1" | Vt 1 | Vt 6 |
| "2" | Vt 2 | Vt 5 |
| "3" | Vt 3 | Vt 4 |
| "4" | Vt 4 | Vt 3 |
| "5" | Vt 5 | Vt 2 |
| "6" | Vt 6 | Vt 1 |
| "7" | Vt 7 | Vt 0 |
| Don't Care | Vt 0 | Vt 0 |

FIG. 20C

| Search Input | WL | WL' |
|---|---|---|
| "0" | Vp | V0 |
| "1" | Vp-1 | V1 |
| "2" | Vp-2 | V2 |
| "3" | Vp-3 | V3 |
| → | → | → |
| "p-2" | V2 | Vp-2 |
| "p-1" | V1 | Vp-1 |
| "p" | V0 | Vp |
| Wildcard | Vp | Vp |

| Stored Data | FG | FG' |
|---|---|---|
| "0" | Vt 0 | Vt p |
| "1" | Vt 1 | Vt p-1 |
| "2" | Vt 2 | Vt p-2 |
| "3" | Vt 3 | Vt p-3 |
| → | → | → |
| "p-2" | Vt p-2 | Vt 2 |
| "p-1" | Vt p-1 | Vt 1 |
| "p" | Vt p | Vt 0 |
| Don't Care | Vt 0 | Vt 0 |

HIGH-LEVEL ARCHITECTURE FOR 3D-NAND BASED IN-MEMORY SEARCH

BACKGROUND

Field

This disclosure relates to 3D in-memory searching, implementable using 3D-NAND memory and as applicable to big data and/or artificial intelligence (AI) processing.

Description of Related Art

Growth of big data and AI (such as AI hardware accelerators) are increasing the importance of searching, comparing, and/or sorting data. Conventional systems implement concurrent searching using ternary content addressable memory (TCAM) technology.

Conventional TCAM technology is implementable using static randomly accessible memory (SRAM) techniques, and thus has relatively low memory density (such as 16 transistors to form a single TCAM cell) and relatively high power usage.

Recently proposed TCAM technology is implementable using non-volatile memory techniques, such as based on two transistor two resistor (2T2R) techniques and two ferroelectric field-effect transistor (2FeFET) techniques. However, the non-volatile-implemented TCAM techniques require paired memory for a single TCAM cell (or paired memory cells to implement one search bit or one data bit) and therefore efficiency of searching and data storage is limited.

Example techniques using NAND-flash-based in-memory searching functions enabled to perform exact matching and approximate matching operations are described in P. H. Tseng et al., In-Memory-Searching Architecture Based on 3D-NAND Technology with Ultra-high Parallelism, 2020 IEDM; and P. H. Tseng et al., In-Memory Approximate Computing Architecture Based on 3D-NAND Flash Memories, 2022 VLSI.

Thus, techniques are needed that enable high performance searching, comparing, and/or sorting, such as relating to big data and/or AI processing.

SUMMARY

A system of one or more computers is configurable to perform particular operations or actions by virtue of having software, firmware, hardware, or a combination thereof installed on the system that in operation causes or cause the system to perform the particular operations or actions. One or more computer programs are configurable to perform particular operations or actions by virtue of including instructions that, when executed by data processing apparatus, cause the apparatus to perform the particular operations or actions.

A first aspect includes an integrated circuit that includes a 3D-NAND memory array includes a plurality of bit lines coupled to respective sense amplifiers; a data encoder enabled to encode data to store in the 3D-NAND memory array in accordance with a particular encoding; a search encoder enabled to (i) encode a first search word to produce an encoded first search word that is encoded according to the particular encoding, (ii) encode a second search word to produce an encoded second search word that is encoded according to the particular encoding, and (iii) respectively apply the encoded first search word and the encoded second search word to respective first and second portions of the 3D-NAND memory array; and a logic operations module enabled to perform one of a plurality of selectable logical operations; where the first portion of the 3D-NAND memory array is enabled, responsive to a first portion of data stored therein and further responsive to the encoded first search word, to produce first sense results using a first portion of the respective sense amplifiers, where the second portion of the 3D-NAND memory array is enabled, responsive to a second portion of data stored therein and further responsive to the encoded second search word, to produce second sense results using a second portion of the respective sense amplifiers, and where the logic operations module is enabled to process the first sense results and the second sense results according to a selected one of the selectable logic operations. Other examples of this aspect include corresponding computer systems, apparatus, and computer programs recorded on one or more computer storage devices, each configured to perform the actions of the methods.

Variations optionally include one or more of the following features. The integrated circuit where the plurality of selectable logical operations includes a logical AND operation, a logical OR operation, a logical XNOR operation, and a logical XOR operation. The particular encoding is in accordance with using a pair of memory devices of the 3D-NAND memory array to store a digit of a data value of the first portion of data, and further in accordance with using a pair of word lines to apply a digit of the first search word to the pair of memory devices. The particular encoding is in accordance with representing 0, 1, and x states by respective setting of threshold voltages of first and second memory devices of the pair of memory devices. The particular encoding is in accordance with representing 0, 1, 2, 3, 4, 5, 6, and 7 states by respective setting of threshold voltages of first and second memory devices of the pair of memory devices. The first search word optionally includes a plurality of digits, and the search encoder is further enabled to encode the digits of the plurality of digits in correspondence with a plurality of layers the first portion of data is stored in. The plurality of layers corresponds to one or more planar process layers of the integrated circuit. Word lines of the first portion of the 3D-NAND memory array are separate from word lines of the second portion of the 3D-NAND memory array. The first search word and the second search word vary according to number of characters, number of digits per character, or both. Variations of the described techniques include hardware, a method or process, or computer software on a computer-accessible medium.

A second aspect includes a method that includes receiving a first search word and a second search word in a 3D-NAND memory; searching for the first search word among stored values of the 3D-NAND memory, producing first bit line sense results; searching for the second search word among the stored values of the 3D-NAND memory, producing second bit line sense results; and combining the first bit line sense results and the second bit line sense results according to a selected one of a plurality of selectable logical operations, producing overall search results; and where the combining is performed using circuitry on a same integrated circuit die that includes the 3D-NAND memory. Other examples of this aspect include corresponding computer systems, apparatus, and computer programs recorded on one or more computer storage devices, each configured to perform the actions of the methods.

Variations optionally include one or more of the following features. The method where the plurality of selectable logical operations optionally includes a logical AND operation, a logical OR operation, a logical XNOR operation, and a logical XOR operation. The stored values are encoded according to a particular encoding, the searching for the first search word includes encoding the first search word according to the particular encoding, and the searching for the second search word includes encoding the second search word according to the particular encoding. The particular encoding is in accordance with using a pair of memory devices of the 3D-NAND memory to store a digit of the stored values, and further in accordance with using a pair of word lines to apply a digit of the first search word to the pair of memory devices. The particular encoding is in accordance with representing 0, 1, and x states by respective setting of threshold voltages of first and second memory devices of the pair of memory devices. The particular encoding is in accordance with representing 0, 1, 2, 3, 4, 5, 6, and 7 states by respective setting of threshold voltages of first and second memory devices of the pair of memory devices. The first search word includes a plurality of digits, and the searching for the first search word includes searching for each of the digits of the plurality of digits in a respective one of a plurality of layers the stored values of the 3D-NAND memory are organized in. The plurality of layers corresponds to one or more planar process layers of an integrated circuit that includes the 3D-NAND memory. The searching for the first search word and the searching for the second search word proceed in parallel respectively using a first portion of the 3D-NAND memory and a second portion of the 3D-NAND memory, word lines of the first portion are separate from word lines of the second portion, and bit lines of the first portion are separate from bit lines of the second portion. The first search word and the second search word vary according to number of characters, number of digits per character, or both. Variations of the described techniques optionally include hardware, a method or process, or computer software on a computer-accessible medium.

A third aspect includes an integrated circuit that includes a first 3D-NAND memory array that includes first bit lines coupled to respective first sense amplifiers and a second 3D-NAND memory array that includes second bit lines coupled to respective second sense amplifiers; a data encoder enabled to encode data to store in the first 3D-NAND memory array and the second 3D-NAND memory array in accordance with a particular encoding; a search encoder enabled to (i) encode a first search word to produce an encoded first search word that is encoded according to the particular encoding, (ii) encode a second search word to produce an encoded second search word that is encoded according to the particular encoding, and (iii) respectively apply the encoded first search word and the encoded second search word to the first 3D-NAND memory array and the second 3D-NAND memory array; and a logic operations module enabled to perform one of a plurality of selectable logical operations; where the first 3D-NAND memory array is enabled, responsive to a first portion of data stored therein and further responsive to the encoded first search word, to produce first sense results using the respective first sense amplifiers, where the second 3D-NAND memory array is enabled, responsive to a second portion of data stored therein and further responsive to the encoded second search word, to produce second sense results using the respective second sense amplifiers, and where the logic operations module is enabled to process the first sense results and the second sense results according to a selected one of the selectable logic operations. Other examples of this aspect include corresponding computer systems, apparatus, and computer programs recorded on one or more computer storage devices, each configured to perform the actions of the methods.

BRIEF DESCRIPTION OF THE DRAWINGS

FIGS. 16A, 16B, and 16C collectively illustrate an example of an encoding technique using eight threshold levels and providing a larger current indication for mismatches between search data and stored data.

FIGS. 20A, 20B, and 20C collectively illustrate an example of an encoding technique using eight threshold levels and providing a smaller current indication for mismatches between search data and stored data.

DETAILED DESCRIPTION

Figure 1A:
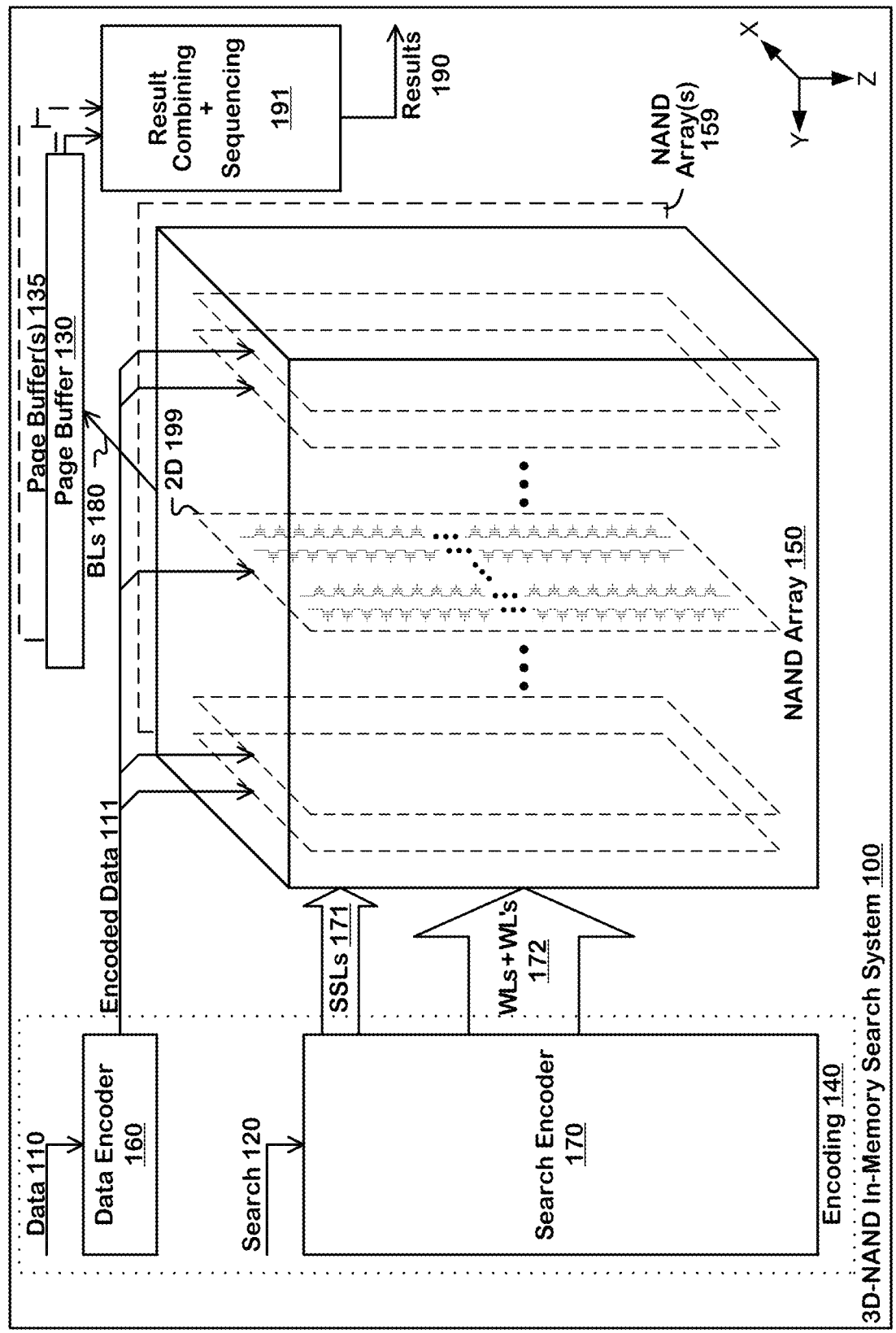
FIGS. 1A, 1B, and 1C (collectively referred to as FIG. 1) together illustrate selected details of an implementation of a high-level architecture for 3D-NAND based in-memory search.

A detailed description of techniques relating to a high-level architecture for 3D-NAND based in-memory search is provided with reference to FIGS. 1A, 1B, 1C, 2, 3, 4, 5, 6, 7, 8, 9, 10, 11, 12A, 12B, 13, 14, 15A, 15B, 16A, 16B, 16C, 17A, 17B, 18, 19A, 19B, 20A, 20B, 20C, 21A, and 21B.

The high-level architecture for 3D-NAND based in-memory search provides for receiving searches for application to select lines and word lines of a non-volatile 3D memory array. The architecture uses two word lines per unit of information of the searches and two memory devices per unit of a stored feature to search against. The architecture uses respective bit lines of the non-volatile 3D memory array as respective matching lines for searching. Respective memory strings (e.g., NAND memory strings) of the non-volatile 3D memory array are usable to store respective data values, e.g., corresponding to elements to search for. Respective pluralities of the memory strings are coupled in parallel to respective shared bit lines. The architecture has applicability to comparing and sorting, in addition to searching in application areas such as artificial intelligence (AI) and big data.

One or more flow diagrams are described herein. Processing described by the flow diagrams is implementable and/or directable using processors programmed using computer programs stored in memory accessible to computer systems and executable by the processors, using dedicated logic hardware (including field programmable integrated circuits), and using various combinations thereof. Various actions are combinable, performable in parallel, and/or performable in a different sequence without affecting processing achieved. In some cases, a rearrangement of actions achieves identical results only if certain other changes are made as well. In other cases, a rearrangement of actions achieves identical results only if certain conditions are satisfied. Furthermore, for clarity, some of the flow diagrams herein omit certain some actions not necessary for understanding the disclosed techniques. Various additional actions are performable before, after, and/or between the illustrated actions.

Examples of selected acronyms, mnemonics, and abbreviations used in the description are as follows.

| (Acronym/Mnemonic/Abbreviation) Example |
|---|
| (2FeFET) Two Ferroelectric Field Effect Transistor |
| (2T0C (DRAM-like device)) Two-Transistor Zero-Capacitor |
| (2T2R) Two Transistor Two Resistor |
| (AI) Artificial Intelligence |
| (BL) Bit Line |
| (CSL) Common Source Line |
| (DNA) DeoxyriboNucleic Acid |
| (DRAM) Dynamic Random Access read/write Memory |
| (FeFET) Ferroelectric Field-Effect Transistor |
| (GSL) Ground Select Line |
| (IMS) In-Memory Search |
| (NAND) Not AND; e.g., series connection of devices forming a memory string |
| (NVM) Non-Volatile Memory |
| (SONOS (memory)) Silicon-Oxide-Nitride-Oxide-Silicon (memory) |
| (SRAM) Static Random Access read/write Memory |

| (Acronym/Mnemonic/Abbreviation) Example |
|---|
| (SSD) Solid State Drive |
| (SSL) String Select Line |
| (TCAM) Ternary Content Accessible Memory |
| (WL) Word Line |

An example of a search criteria is a collection of information indicating what to search for and how to perform a search. The search criteria include any combination of a search value and one or more indicators of how to perform the search. The indicators of how to perform the search include a length of a search word, a number of digits in a search word, which and/or how many NAND arrays to search, which logical operation (if any) to use to combine search results from more than one NAND array, whether to perform searching in serial or parallel, how to segment a long word, how to section a long word, how to group portions of a word, and so forth, as applicable to any one or more of FIGS. 5, 6, 7, 8, 9, 10, 11, 12A, and 12B.

An example of a search value is a search word comprising one or more characters. An example of a data value (such as storable in or searchable for a NAND array) is a data word comprising one or more characters. Each character (of either a search word or a data word) comprises one or more digits. Each digit enables representation of a plurality of mutually exclusive states. The mutually exclusive states are according to a numerical representation base, such as base 2 for binary digits (bits), or such as base 8 for octal digits.

An example of a memory string is a plurality of series-connected memory devices. An example of a memory device is an element enabled to store information to indicate one of at least two mutually exclusive states of the memory device. The states are settable via programming the memory device and are readable via activating a control input of the memory device. In several types of memory devices (e.g., floating gate memory devices), the programming is via configuring a threshold voltage of the memory device and the control input is a control gate input. The configuring is also referred to as programming the memory device (e.g., to a one or a zero, or some other value), and is also referred to as storing the value (e.g., a one or a zero, or some other value).

The 3D memory array is comprised of a plurality of 2D memory arrays. Each 2D memory array is comprised of a plurality of memory string pairs. Each memory string is comprised of source/drain serially connected non-volatile memory devices each having a respective control gate input. The control gate inputs are connected to respective word lines, operated in pairs according to the pairs of memory strings and respective pairs of devices therein. Each string additionally comprises a string select device source/drain serially connected to the non-volatile memory devices. The string select device has a gate input connected to a string select control input. Each string additionally comprises one or more source/drain serially connected control devices having respective gates and associated control inputs.

3D-NAND In-Memory Search Concepts Disclosed herein is a novel high-level architecture for 3D-NAND based in-memory search implementable using a 3D searching memory (e.g., a 3D-NAND memory) that enables high performance searching, comparing, and/or sorting, such as relating to big data and/or AI processing. The architecture provides for low latency, high resolution, high content density, multi-block functionality, and robust reliability. The architecture is applicable to various fields such as big-data searching, AI hardware accelerators and/or classifiers, approximate computing, associative memory, few-shot learning, SSD data management, DNA matching, data filtering, hyper-dimensional computing, as well as other applications benefiting from in-memory searching enabled for long search words and large data capacities.

A host agent directs storage of data in the 3D searching memory. In response, the 3D searching memory stores the data. Then, the host agent provides searches to the 3D searching memory. In response, the 3D searching memory processes the searches by determining zero or more matches within the stored data in accordance with the searches.

A control agent of the 3D searching memory receives the data for storage from the host agent, and in response directs the 3D searching memory to configure included memory devices to store the data (e.g., via included programming circuitry). The control agent receives the searches, and in response directs one or more 2D memory resources of the 3D searching memory in accordance with the searches, providing search results (e.g., match indications) to the host agent.

Techniques relating to a high-level architecture for 3D-NAND based in-memory search enable efficiently searching a 3D searching memory for a match against data stored in the 3D searching memory according to search criteria, such as any combination of a search value, and one or more indicators of how to perform the search.

For example, the 3D memory array is implemented using NVM technology, such as comprised of floating-gate programmable memory devices. The three dimensions of the 3D memory array are referred to herein as X, Y, and Z. One or more 3D searching memory and/or 3D memory array instances are implementable as all or any portions of an integrated circuit manufactured from wafer material using planar processing technology. The X and Y dimensions correspond to the horizontal plane of the planar processing. The Z dimension corresponds to the vertical dimension of the planar processing, e.g., vertically stacked layers of material.

The 3D memory array is comprised of a plurality of 2D memory arrays. Each 2D memory array is comprised of a plurality of memory string pairs. Each memory string is comprised of source/drain serially connected non-volatile memory devices each having a respective control gate input. The control gate inputs are connected to respective word lines, operated in pairs according to the pairs of memory strings and respective pairs of devices therein. Each string additionally comprises a string select device source/drain serially connected to the non-volatile memory devices. The string select device has a gate input connected to a string select control input. Each string additionally comprises one or more source/drain serially connected control devices having respective gates and associated control inputs.

Search criteria includes a search value, and one or more indicators of how to perform the search. The search value is what is to be searched for in the 3D searching memory. The search value has a length, such as measured in characters sometimes referred to as digits. The digits are according to a numerical representation base, such as base 2 for binary digits (bits), or such as base 8 for octal digits.

Encoding of search inputs and data values is according to how circuitry determines a match (mismatch), e.g., via large/larger or small/smaller current. For example, a part of a page buffer (e.g., a sense amplifier) determines that a match is indicated by a larger current than a mismatch. For another example, a page buffer determines that a match is indicated by a smaller current than a mismatch.

Encoding of search inputs and data values is further according to unique representations for each digit. Each unique representation corresponds to a level. Encodings are implementable for two-level, eight-level, p-level (multiple-level), and analog techniques.

Techniques relating to a high-level architecture for 3D-NAND based in-memory search enable high-speed searching for long-word data matches from among a large number of stored values.

In some usage scenarios, read latency of a 3D searching memory is reduced (at the potential expense of a relatively large current transient) by operating multiple blocks concurrently. The concurrent operating is via switching a plurality of activation controls, e.g., string select lines (SSLs).

3D-NAND In-Memory Search Example Implementation

Figure 1B:
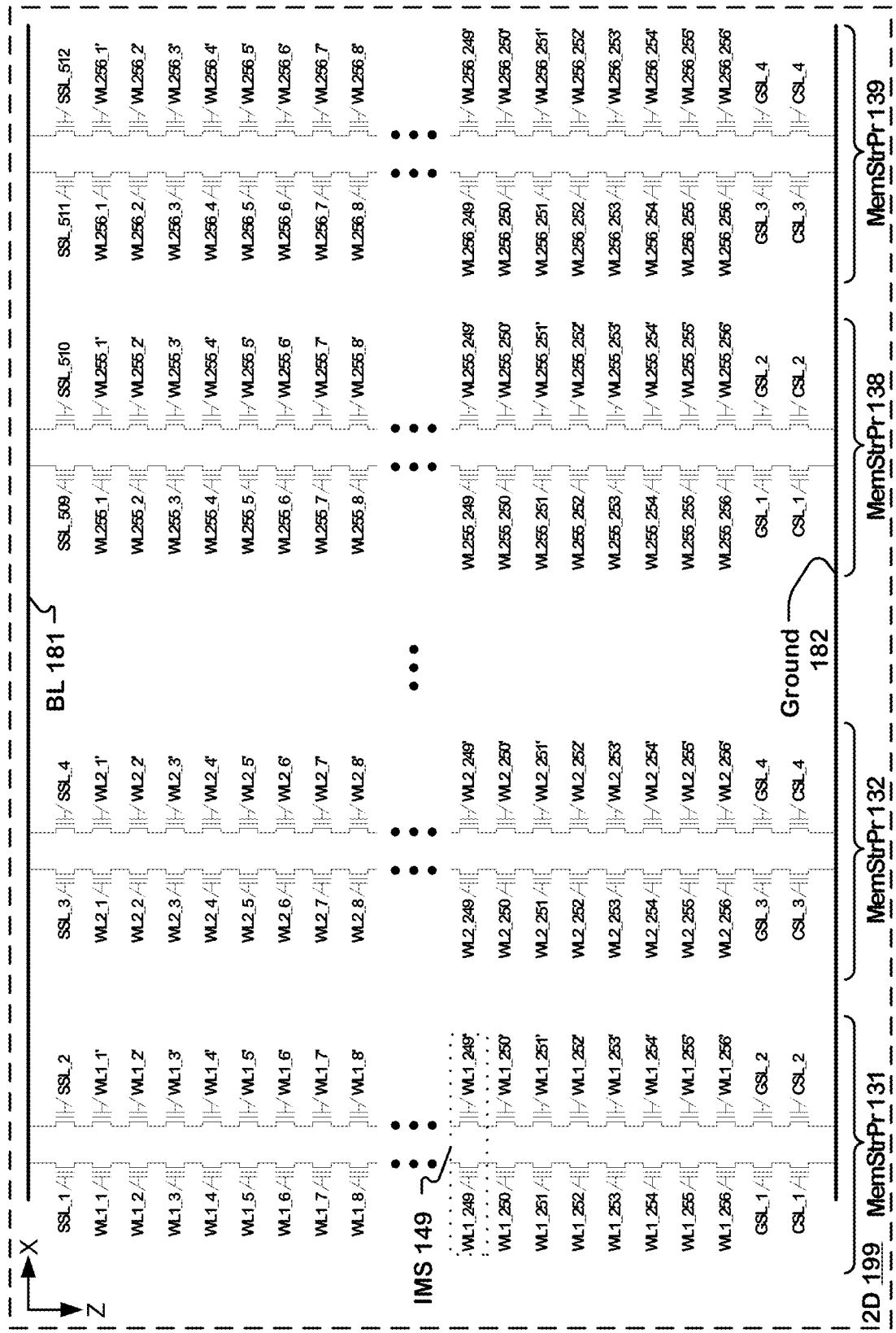
Figure 1C:
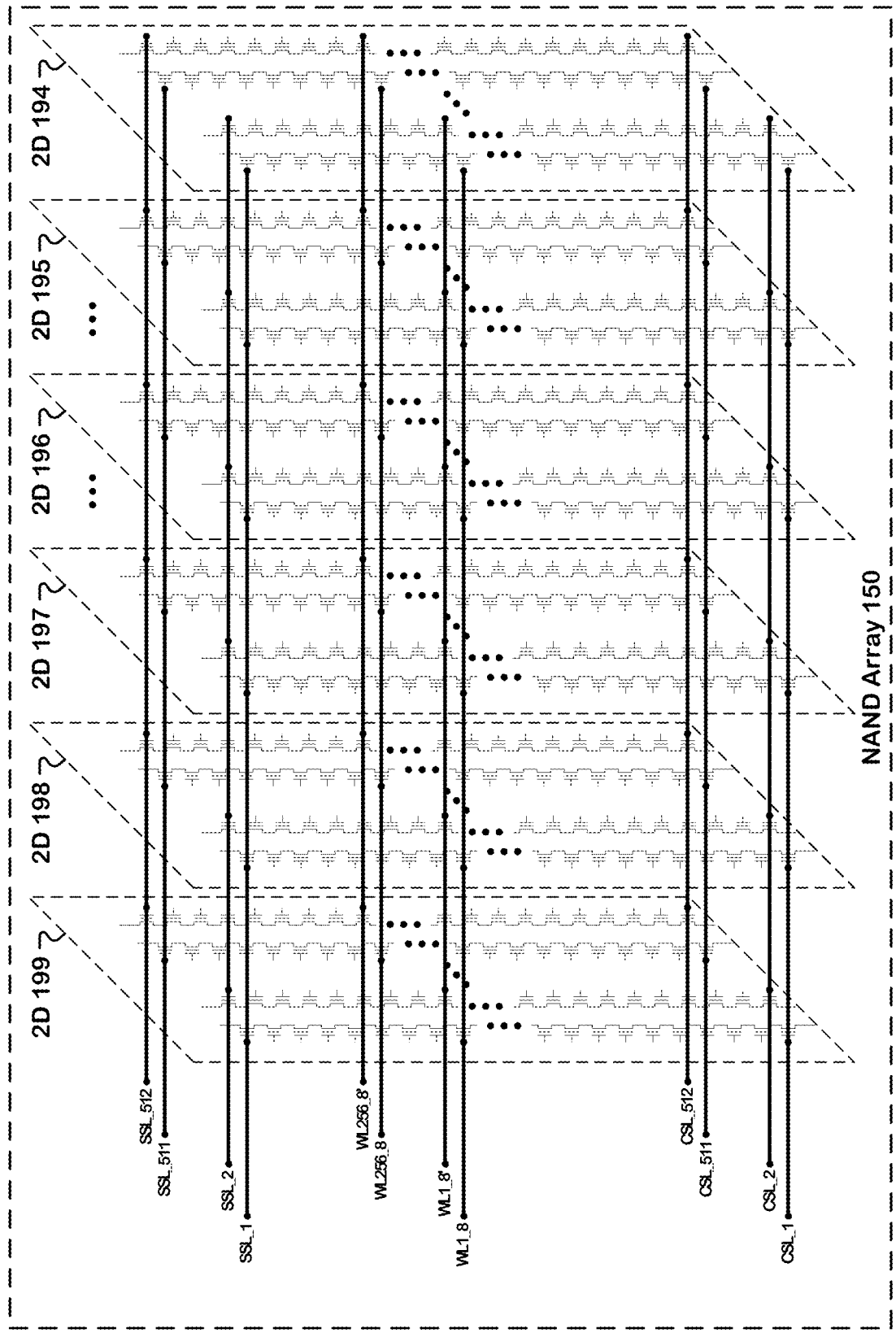

FIGS. 1A, 1B, and 1C (collectively referred to as FIG. 1) together illustrate selected details of an implementation of a high-level architecture for 3D-NAND based in-memory search.

FIG. 1A illustrates an example implementation of a high-level architecture for 3D-NAND based in-memory search, as 3D-NAND In-Memory Search System 100.

3D-NAND In-Memory Search System 100 is implemented in three dimensions (X, Y, and Z), comprising encoding, storage/searching, and output resources. The encoding resources comprise Data Encoder 160 (e.g., data encoding circuitry), enabled to receive Data 110 and in response provide Encoded Data 111 (e.g., programming data) to the storage/searching resources. The encoding resources further comprise Search Encoder 170, enabled to receive Search 120 and in response provide string search lines, illustrated as String Search Lines (SSLs) 171 as well as pairs of WLs, illustrated as Word Lines (WLs+WL's) 172 to the storage/searching resources. The encoding performed by the encoding resources is according to a particular encoding technique, as illustrated by dotted box Encoding 140. The storage/searching resources comprise NAND Array 150 that in turn comprises a plurality of instances of 2D memory arrays, one of which is specifically identified as 2D Memory Array (2D) 199. The output resources comprise Page Buffer 130 (that includes, e.g., sense amplifiers), enabled to receive bit line information from each of the 2D memory arrays of NAND Array 150, illustrated as Bit Lines (BLs) 180. The output resources further comprise Result Combining+Sequencing 191 that provides search results as Results 190. 3D-NAND In-Memory Search System 100 optionally further comprises additional NAND arrays, illustrated as NAND Array(s) 159 and respective page buffers, illustrated as Page Buffer(s) 135.

3D-NAND In-Memory Search System 100 is variously implementable, e.g., on a single integrated circuit die, a plurality of integrated circuit, or as a component of a System-On-a-Chip (SOC). As a specific example, 3D-NAND In-Memory Search System 100 is implemented on a single integrated circuit die, enabling performing searching and combining logical operations wholly within the single integrated circuit die.

For clarity, the figure omits selected details relating to programming programmable memory devices of the 2D memory arrays.

In some examples, Search Encoder 170 (that includes, e.g., search encoding circuitry), Bit Lines (BLs) 180, and/or Result Combining+Sequencing 191 are enabled to sequence through layers, e.g., switching searching from layer one to layer two and/or layer seven, and so forth.

FIG. 1B illustrates selected details of an example of a 2D memory array, as 2D Memory Array (2D) 199.

2D Memory Array (2D) 199 comprises 256 memory string pairs. For clarity, the figure explicitly illustrates four of the pairs, Memory String Pairs 131, 132, 138, and 139. Each of the memory string pairs comprises a series-connected string of devices, connected between Bit Line (BL) 181 and Ground 182. Each series-connected string of devices comprises a plurality of source/drain serially connected non-volatile memory devices, 256 devices total. Each of the non-volatile memory devices has a respective control gate input connected to a respective WL. As a specific example illustrated in the figure, Memory String Pair 131 comprises 256 non-volatile memory devices in a left-hand memory string of the memory string pair and 256 non-volatile memory devices in a right-hand string of the memory string pair. For clarity, a subset of the devices is explicitly illustrated.

The control gate inputs of the non-volatile memory devices of the left-hand memory string of Memory String Pair 131 are respectively connected to WLs WL1_1 . . . . WL1_256.

Similarly, control gate inputs of the non-volatile memory devices of the right-hand memory string of Memory String Pair 131 are respectively connected to WLs WL1_1' . . . . WL1_256'. Note that the apostrophe (') is read as "prime" indicating a relationship between a pair of WLs, e.g., WL1_1 and WL1_1' are related as being coupled to respective memory devices of a same in-memory search cell.

Note that WLs are identified by two integers, CharacterNumber, and LayerNumber, as well as an optional apostrophe suffix:
WL<CharacterNumber>_<LayerNumber>[']. For example, WL1_8 corresponds to character 1 (of, e.g., a stored data word) and layer 8 (of NAND Array 150). Layer 8 of NAND Array 150 corresponds to one or more stacked layers of material formed in the vertical (e.g., Z) dimension as a result of integrated circuit planar processing, interposed between layers 7 and 9 of NAND Array 150. Thus, layer 8 of NAND array 150 corresponds to one or more planar process layers of an integrated circuit. Lack of an apostrophe suffix signifies the left-hand string of a memory string pair. For another example, WL1_8' corresponds to character 1 and layer 8, identically to WL1_8. The apostrophe suffix signifies the right-hand string of the memory string pair.

As is described in more detail elsewhere herein, the non-volatile memory devices of the left-hand and right-hand memory strings are used in pairs according to a specific encoding technique (such as Encoding 140 of FIG. 1) to perform matching for searching operations. An example of one of the non-volatile memory device pairs is illustrated as In Memory String cell (IMS) 149. The control gate of the left-hand non-volatile device of the pair is connected to WL1_249 and the control gate of the right-hand non-volatile device of the pair is connected to WL1_249'.

Each series-connected string of devices additionally comprises a string select device that is source/drain serially connected to the non-volatile memory devices. The string select device has a gate input connected to a string select control input (e.g., SSL_1 of the left-hand memory string of Memory String Pair 131 and SSL_2 of the right-hand memory string of Memory String Pair 131). The pair of string select lines of each memory string pair (e.g., SSL_1 and SSL_2) is operable as a pair (e.g., responsive to a search operation) to enable (disable) the left-hand and right-hand memory strings of the memory string pair together.

Each series-connected string of devices additionally comprises a ground select device that is source/drain serially connected to the non-volatile memory devices. The ground select device has a gate input connected to a ground select control input (e.g., GSL_1 of the left-hand memory string of Memory String Pair 131 and GSL_2 of the right-hand memory string of Memory String Pair 131). The pair of ground select lines of each memory string pair (e.g., GSL_1 and GSL_2) is operable as a pair (e.g., responsive to a search operation) to enable (disable) the left-hand and right-hand memory strings of the memory string pair together.

Each series-connected string of devices additionally comprises a common select device that is source/drain serially connected to the non-volatile memory devices. The common select device has a gate input connected to a common select control input (e.g., CSL_1 of the left-hand memory string of Memory String Pair 131 and CSL_2 of the right-hand memory string of Memory String Pair 131). The pair of common select lines of each memory string pair (e.g., CSL_1 and CSL_2) is operable as a pair (e.g., responsive to a search operation) to enable (disable) the left-hand and right-hand memory strings of the memory string pair together.

Each element of the pair of string select lines of each memory string pair (e.g., SSL_1 and SSL_2) is operable individually (e.g., responsive to other than search operations, such as erase and/or programming operations). For example, SSL_1 is operable independently of SSL2 to enable programming of devices in the left-hand memory string of Memory String Pair 131. Similarly, each element of the pair of ground select lines and common select lines is operable individually and/or independently of the other element of the pair.

The figure illustratively depicts 2D Memory Array (2D) 199 as having 256 memory string pairs each having 256 non-volatile memory devices connected in series. Other examples have other numbers of memory string pairs and/or other numbers of non-volatile memory devices connected in series.

FIG. 1C illustrates selected details of a NAND array, as NAND Array 150.

The figure illustrates several representative instances of the 2D memory arrays of NAND Array 150, specifically 2D Memory Arrays (2D) 194-199. The figure also illustrates several representative interconnections of the gates of the devices of the 2D memory arrays. Specifically, all the gates of the devices at a particular X, Y location of each of the 2D memory arrays are connected in parallel. The figure illustrates representative parallel connections for string select lines SSL_1, SSL_2, SSL511, and SSL512; WL pair WL1_8 and WL1_8', WL pair WL256_8 and WL256_8'; and common select lines CSL_1, CSL_2, CSL511, and CSL512.

Thus, in an example having 128K 2D memory arrays, each of the string select lines connects to 128K gates, each of the WLs of each WL pair connects to 128K gates, and so forth. Other examples have other numbers of 2D memory arrays.

3D-NAND In-Memory Search Data Storage

Figure 2:
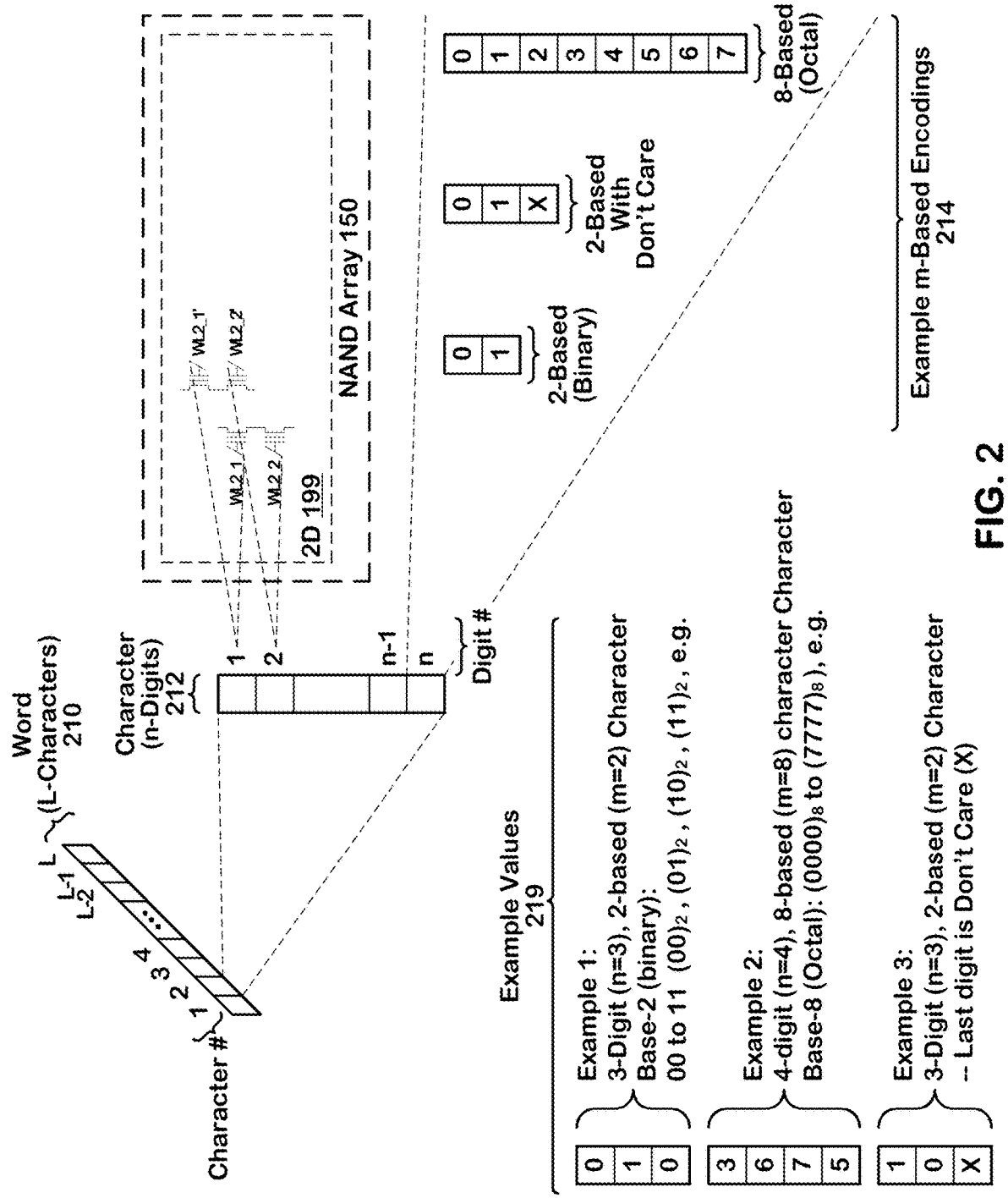
FIG. 2 illustrates examples of words, characters, bases, and digits for a high-level architecture for 3D-NAND based in-memory search.

FIG. 2 illustrates examples of words, characters, bases, and digits for a high-level architecture for 3D-NAND based in-memory search, in a context of 2D Memory Array (2D) 199 of NAND array 150 of FIG. 1.

Data is stored (e.g., in part via 160 of FIG. 1A) and searches are performed (e.g., in part via Search Encoder 170 of FIG. 1A), in accordance with a selected encoding (e.g., as represented by Encoding 140 of FIG. 1A). The data and the searches are represented as a word. An example of a word is Word (L-Characters) 210 of FIG. 2, having L characters (1, 2, 3, 4 .... L−2, L−1, and L). Each character, in turn, is interpretable as a plurality of digits, an example of which is Character (n-Digits) 212, having n digits (1, 2 ... n−1, and n). Each digit, in turn, optionally represents one of a plurality of mutually exclusive encodings, examples of which are Example m-Based Encodings 214.

WL drivers (e.g., of Word Lines (WLs+WL's) 172 of FIG. 1) drive pairs of WLs based on each digit in accordance with a selected encoding (e.g., as represented by Encoding 140 of FIG. 1). Thus, the WL drivers drive WL2_1 and WL2_1' based on the 1st digit of the 2nd character, and drive WL2_2 and WL2_2' based on the 2nd digit of the 2nd character.

FIG. 2 illustrates example encodings as Example m-Based Encodings 214. The example m-based encodings include a 2-based (e.g., binary) encoding enabled to represent "0" and "1" values, along with a 2-based encoding enabled to represent a Don't Care "X" in addition to "0" and "1" values. The example m-based encodings also include an 8-based (e.g., octal) encoding enabled to represent "0", "1", "2" ... "6", and "7".

FIG. 2 illustrates example values according to the example m-based encodings as Example Values 219.

According to usage scenarios and implementations, a character has, e.g., from one to 256 characters.

Figure 3:
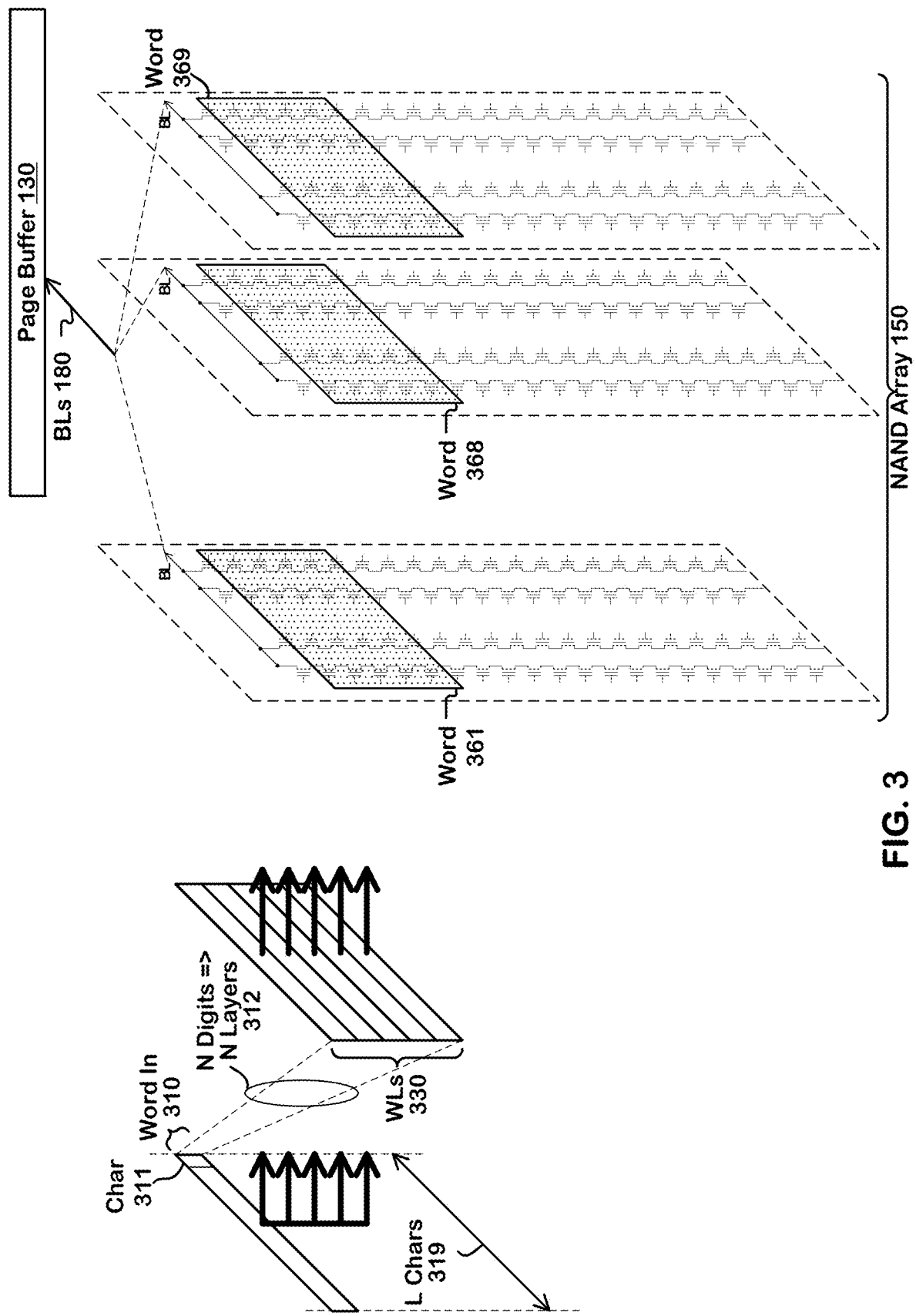
FIG. 3 illustrates an example of data storage for subsequently searching a NAND array.

FIG. 3 illustrates an example of data storage for subsequently searching a NAND array. The illustrative context is NAND Array 150 with Bit Lines (BLs) 180 and Page Buffer 130 (all of FIG. 1A).

A host agent provides a search word as Word In 310 (e.g., via Search 120 of FIG. 1 as a search value of search criteria), having a plurality of characters, L Characters 319. The figure illustrates one of the characters as Character 311, and in turn illustrates the character having digits that are mapped, N Digits=>N Layers 312, to layers of NAND Array 150. WL drivers drive WLs encoded according to a selected encoding, illustrated conceptually as Word Lines (WLs) 330.

In the illustrated example, there are five digits in each character. Thus, each corresponding stored data word of NAND Array 150 is stored using five layers, as represented in each of Word 361, Word 368, and Word 369. The figure illustrates each of the stored words as stored in a corresponding 2D array having a respective BL collectively coupled (Bit Lines (BLs) 180) to Page Buffer 130.

Each digit of each character of Word In 310 is encoded according to the selected encoding onto respective pairs of WLs (as FIG. 2 illustrates).

Figure 4:
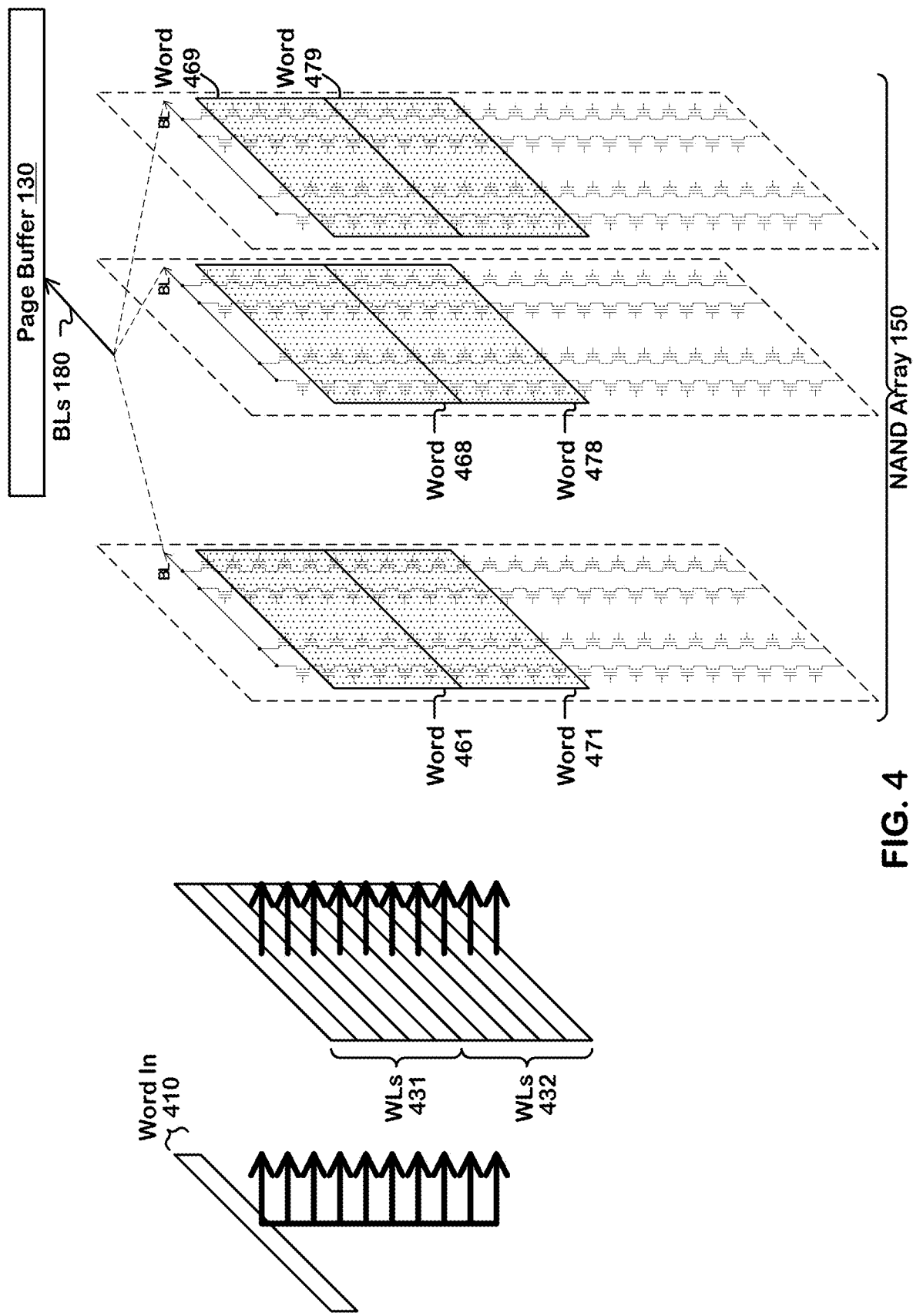
FIG. 4 illustrates another example of data storage for subsequently searching a NAND array.

FIG. 4 illustrates another example of data storage for subsequently searching a NAND array. As in FIG. 3, the illustrative context is NAND Array 150 with Bit Lines (BLs) 180 and Page Buffer 130 (all of FIG. 1A). Rather than storing all data in a single set of layers as illustrated in FIG. 3, FIG. 4 illustrates storing data in a plurality of sets of layers. A first set of layers is represented as used by Words 461, 468, and 469. A second set of layers is represented as used by Words 471, 478, and 479. Parallel search is performable throughout the first and the second sets of layers.

A host agent provides a search word as Word In 410 (e.g., via Search 120 of FIG. 1 as a search value of search criteria). WL drivers drive WLs encoded according to a selected encoding, illustrated conceptually as Word Lines (WLs) 431 and Word Lines (WLs) 432.

Each digit of each character of Word In 310 is encoded according to the selected encoding onto respective pairs of WLs (as FIG. 2 illustrates).

FIGS. 5, 6, 7, 8, 9, 10, 11, 12A, and 12B illustrate various techniques for searching for one or more words in one or more 3D-NAND arrays. Like-numbered elements in those figures are identical, substantially similar, similar, or variations thereof, with respect to elements of FIG. 1. Throughout those figures, the operating context is as described in and with respect to FIG. 1.

Further throughout those figures, operation begins with a host agent directing storage of data values in NAND Array 150 (or equivalents) according to a selected encoding technique (such as any of the techniques as illustrated in overview in FIG. 2 or any 2-level, 8-level, p-level, or analog techniques as illustrated in detail in FIGS. 15A, 15B, 16A, 16B, 17A, 17B, 18, 19A, 19B, 20A, 20B, 20C, 21A, and 21B). Each of the encoding techniques uses a memory string pair for each character in a search word. The storing includes programming of floating-gate programmable memory devices via setting threshold voltages (Vt) according to the selected encoding technique. The stored values are then available for searching.

3D-NAND In-Memory Search Word

Figure 5:
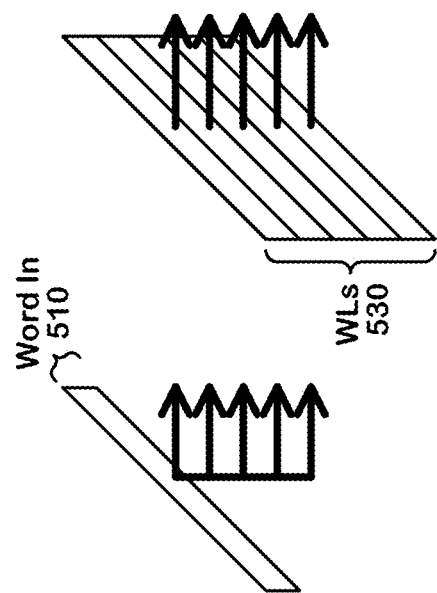
FIG. 5 illustrates techniques for searching for a word in a 3D-NAND array.
Figure 5:
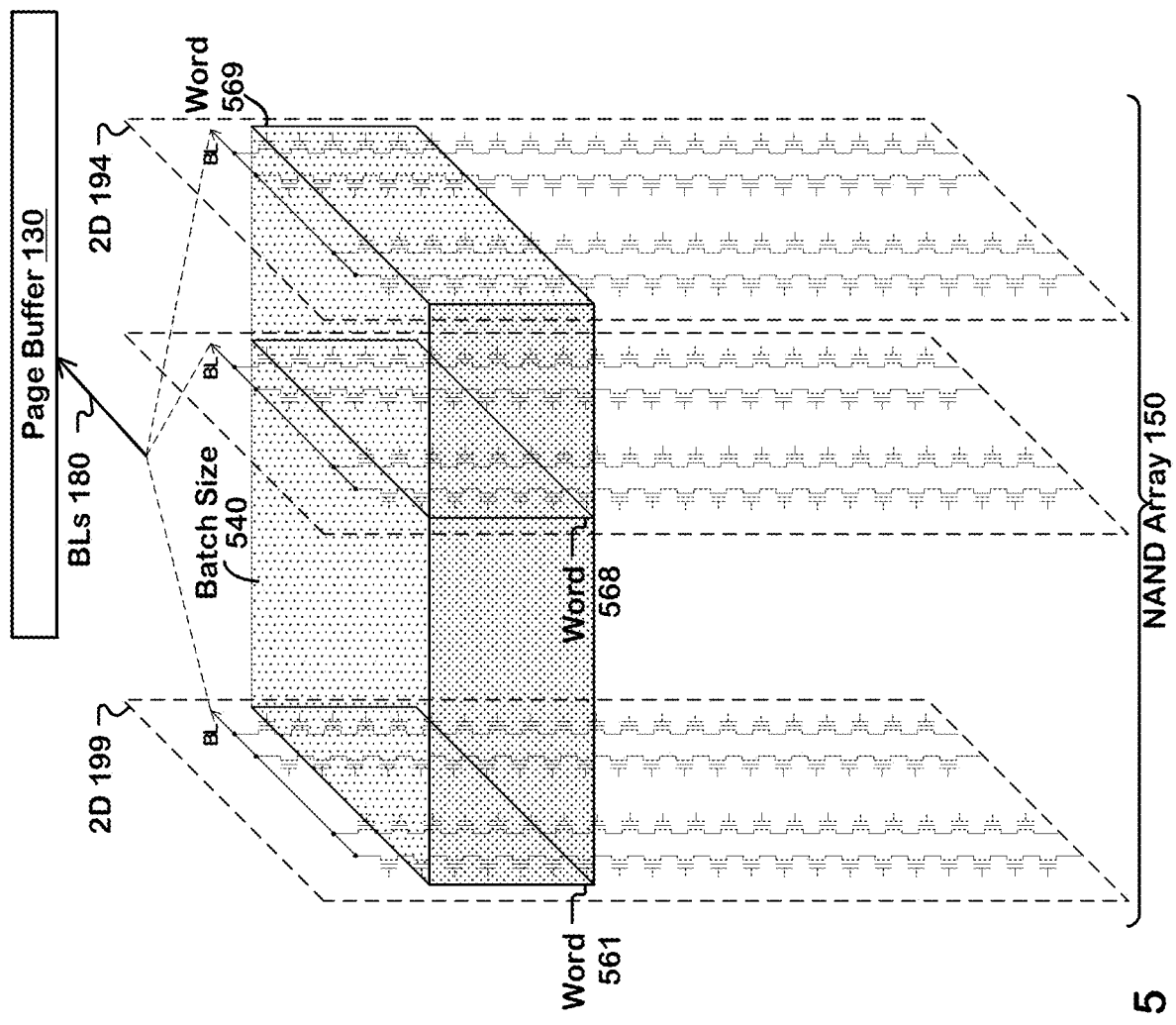

FIG. 5 illustrates techniques for searching for a word in a 3D-NAND array. NAND Array 150 comprises a plurality of 2D arrays, two of which are specifically identified (2D Memory Array (2D) 199 and 2D Memory Array (2D) 194).

In preparation for searching, the host agent has stored data values in NAND Array 150 (including in Words 561, 568, and 569) according to the selected encoding technique.

Then, the host agent requests a search and provides corresponding search criteria. The search criteria comprise a search value that is a search word provided via Word In 510. The search criteria further comprise one or more indicators. For example, an indicator of the search word length (e.g., a number of characters equal to how many memory string pairs are connected to each BL), an indicator that there are five digits per character of the search word, and an indicator to search a single 3D-NAND array. A control agent (not illustrated), operating according to the indicators of the search criteria, directs encoding of the value of Word In 510 according to the selected encoding technique (e.g., via Search Encoder 170 of FIG. 1), and driving onto WLs of the array (e.g., as a bias), as conceptually indicated by Word Lines (WLs) 530. In the specific example illustrated, each character of the word has five digits, and thus five layers of NAND Array 150 are activated for searching. The activated layers correspond to Batch Size 540.

As in other search operations, the control agent directs Page Buffer 130 sensing Bit Lines (BLs) 180 (using included sense amplifiers) and providing sense results, corresponding to evaluating how Word In 510 (represented, e.g., as bias values) matches with respect to stored values (represented, e.g., by Vt values), to Result Combining+Sequencing 191 (of FIG. 1, not illustrated here). In the techniques of FIG. 5, Result Combining+Sequencing 191 operates to provide the sense results directly as (search) Results 190 without combining or sequencing.

In variations of the illustrated operation, a larger batch size is searched by searching more layers. In other variations of the illustrated operation, different layers are searched, such as middle layers, non-contiguous layers, and so forth.

Unused layers (if any, such as due to a data set having fewer values than layers) are operated to effectively be ignored with respect to matching. A passing voltage (e.g., Vpass) is applied to the WLs of the unused layers, Wildcard encodings are applied to control gates of the memory string pairs in the unused layers, and/or the memory devices of the memory string pairs in the unused layers are programmed to store Don't Care values.

Unused memory string pairs (if any, such as due to a data set having fewer characters than memory string pairs in a 2D array) are operated to effectively be ignored with respect to matching. Wildcard encodings are applied to control gates of the unused memory string pairs and/or the memory devices of the unused memory string pairs are programmed to store Don't Care values.

Unused 2D arrays (if any, such as due to a data set having fewer values than 2D arrays) are operated to effectively be ignored with respect to matching. For a first instance, SSL driver circuitry (not illustrated) selectively activates SSLs corresponding to 2D arrays that are used by the search and selectively deactivates SSLs corresponding to 2D arrays that are not used by the search (e.g., there are fewer data values than 2D arrays). For a second instance, sense amplifiers associated with the unused 2D arrays are not activated. For a third instance, sense amplifiers associated with the unused 2D arrays are ignored by Page Buffer 130.

Any one or more of the foregoing techniques for unused layers, unused memory string pairs, and unused 2D arrays are usable individually or in any combination.

3D-NAND In-Memory Search Scaling-Large Data Set/Multiple 3D Arrays

Figure 6:
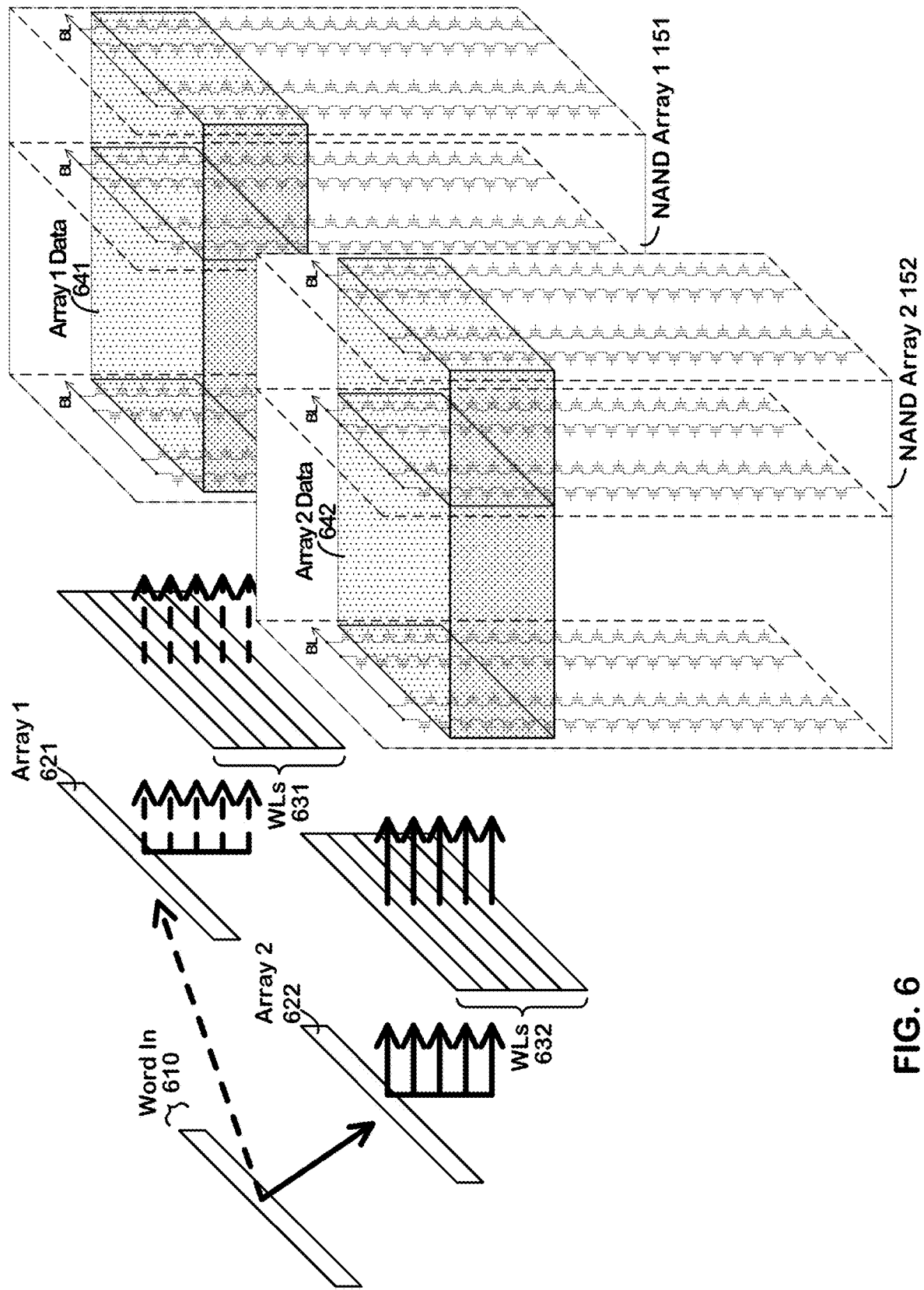
FIG. 6 illustrates techniques for searching for a word in a large data set in a plurality of 3D-NAND arrays.

FIG. 6 illustrates techniques for searching for a word in a large data set in a plurality of 3D-NAND arrays. The searching is similar to that of FIG. 5, except a plurality of 3D-NAND arrays are searched to enable processing of the large data set. A control agent (e.g., Result Combining+Sequencing 191 of FIG. 1) directs searching of the plurality of 3D-NAND arrays either one after the other (e.g., serially), or both at once (e.g., in parallel) and directs subsequent combining of search results. NAND Array 1 151 and NAND Array 2 152 correspond to respective NAND array instances of NAND Array(s) 159 of FIG. 1. For sensing, the BLs of NAND Array 1 151 are coupled to a first page buffer instance of Page Buffer(s) 135 of FIG. 1. Similarly, the BLs of NAND Array 2 152 are coupled to a second page buffer instance of Page Buffer(s) 135 of FIGURE.

In preparation for searching, the host agent has stored data values in NAND Array 1 151 and NAND Array 2 152. The storing is according to the selected encoding technique. The storing is also according to storing a first portion of the data to be searched in NAND Array 1 151 as Array 1 Data 641, and further according to storing a second portion of the data to be searched in NAND Array 2 152 as Array 2 Data 642.

Then, the host agent requests a search and provides corresponding search criteria. The search criteria comprise a search value that is a search word provided via Word In 610. The search criteria further comprise one or more indicators. For example, an indicator of the search word length (e.g., a number of characters equal to how many memory string pairs are connected to each BL), an indicator that there are five digits per character of the search word, and an indicator to search two 3D-NAND arrays for the search word. A control agent (not illustrated), operating according to the indicators of the search criteria, directs encoding of the value of Word In 610 according to the selected encoding technique (e.g., via Search Encoder 170 of FIG. 1), and driving onto WLs of the array (e.g., as a bias), as conceptually indicated by Word Lines (WLs) 631 and Word Lines (WLs) 632. In the specific example illustrated, each character of the word has five digits, and thus five layers of NAND Array 1 151 (NAND Array 2 152) are activated for searching. The activated layers correspond to Array 1 Data 641 (Array 2 Data 642).

As in other search operations, the control agent directs a page buffer sensing BLs of a searched array (using included sense amplifiers) and providing sense results, corresponding to evaluating how Word In 610 matches with respect to stored values.

Two variations of operation with respect to NAND Array 1 151 and NAND Array 2 152 are (1) a serial technique and (2) a parallel technique. Optionally, the search criteria comprise an indicator to perform the search using the serial technique or the parallel technique. Example systems are variously enabled to perform the serial technique, the parallel technique, or both, according to hardware capability.

In the serial technique, the control agent directs applying Word In 610 to NAND Array 1 151 via Array 1 621 and Word Lines (WLs) 631 in a first portion of operation. The first page buffer instance provides first sense results to Result Combining+Sequencing 191. Then, the control agent directs applying Word In 610 to NAND Array 2 152 via Array 2 622 and Word Lines (WLs) 632 in a second portion of operation. The second page buffer instance provides second sense results to Result Combining+Sequencing 191. Result Combining+Sequencing 191 is an example of the control agent that controls sequencing relating to the first and second portions of operation. Result Combining+Sequencing 191 combines the first and second sense results to form an overall search result across Array 1 Data 641 and Array 2 Data 642 to provide as Results 190.

In the parallel technique, the control agent directs applying Word In 610 to NAND Array 1 151 (as in the first portion of operation of the serial technique) and in parallel, directs applying Word In 610 to NAND Array 2 152 (as in the second portion of operation of the serial technique). Result Combining+Sequencing 191 is an example of the control agent that controls sequencing relating to the parallel application of Word In 610 to NAND Array 1 151 and Word In 610 to NAND Array 2 152. Result Combining+Sequencing 191 combines the sense results from the first and second page buffer instances to form an overall search result across Array 1 Data 641 and Array 2 Data 642 to provide as Results 190.

Conceptually, the parallel technique enables producing twice as many search results per unit time as the serial technique.

FIG. 6 is representative of performing two searches (either via the serial technique or the parallel technique) in a 3D-NAND memory array (NAND Array 1 151 and NAND Array 2 152 collectively). A first array (e.g., Array 1 Data 641) is stored in a first portion of the 3D-NAND memory array. A second array of data (e.g., Array 2 Data 642) is stored in a second portion of the 3D-NAND memory array. The first of the two searches (corresponding to Array 1 621) is performed using respective BLs and WLs corresponding to the first portion of the 3D-NAND memory array. The second of the two searches (corresponding to Array 2 622) is performed using respective BLs and WLs corresponding to the second portion of the 3D-NAND memory array. WLs of the first portion of the 3D-NAND array (e.g., the WLs that couple to Array 1 Data 641 stored in NAND Array 1 151) are separate from the WLs of the second portion of the 3D-NAND array (e.g., the WLs that couple to Array 2 Data 642 stored in NAND Array 2 152).

Unused layers, unused memory string pairs, and/or unused 2D arrays are operated to effectively be ignored with respect to matching, as described with respect to FIG. 5.

3D-NAND In-Memory Search Scaling—Long Word/Multiple 3D Arrays

Various techniques enable searching for a long word (e.g., a word having more than L characters). In one technique, a system is enabled to search for a long word among a plurality of 3D-NAND arrays. In another technique, a system is enabled to search for a long word among a plurality of non-contiguous data segments in a single 3D-NAND array. In yet another technique, a system is enabled to search for a long word among a plurality of contiguous data segments in a single 3D-NAND array.

Figure 7:
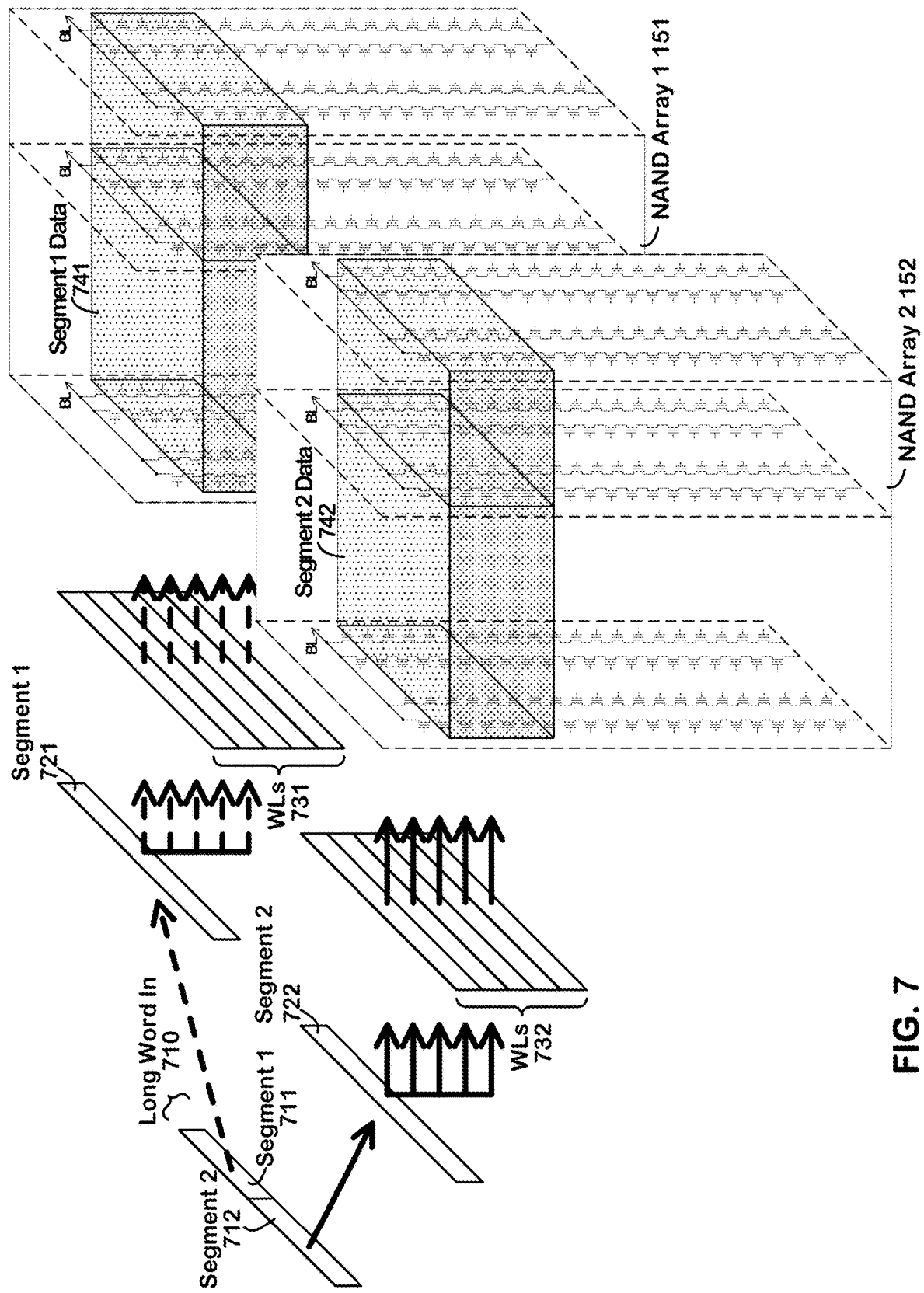
FIG. 7 illustrates techniques for searching for a long word in a plurality of 3D-NAND arrays.

FIG. 7 illustrates techniques for searching for a long word in a plurality of 3D-NAND arrays. The searching is similar to that of FIG. 5, except a control agent (e.g., Result Combining+Sequencing 191 of FIG. 1) directs searching a plurality of 3D-NAND arrays to enable processing of the long word. The control agent directs processing the long word as a plurality of segments each corresponding to a respective one of the plurality of 3D-NAND arrays. Similar to FIG. 6, the control agent directs searching the plurality of 3D-NAND arrays either one after the other (e.g., serially), or both at once (e.g., in parallel). As in FIG. 6, NAND Array 1 151 and NAND Array 2 152 correspond to respective NAND array instances of NAND Array(s) 159 of FIG. 1. Further as in FIG. 6, a first instance (not illustrated) of Page Buffer(s) 135 of FIG. 1 senses NAND Array 1 151, and a second instance (not illustrated) of Page Buffer(s) 135 senses NAND Array 2 152.

Similarly to FIG. 6, in preparation for searching, the host agent has stored data values in NAND Array 1 151 and NAND Array 2 152. The storing is according to the selected encoding technique. The storing is also according to storing a first segment of the data to be searched in NAND Array 1 151 as Segment 1 Data 741, and further according to storing a second segment of the data to be searched in NAND Array 2 152 as Segment 2 Data 742.

Then, the host agent requests a search and provides corresponding search criteria. The search criteria comprise a search value that is a search word provided via Long Word In 710. The search criteria further comprise one or more indicators. For example, an indicator of the search word length (e.g., a number of characters equal to how many memory string pairs are connected to each BL), an indicator that there are five digits per character of the search word, and an indicator to search two 3D-NAND arrays for respective segments of the search word. Similarly to FIG. 6, a control agent (not illustrated), operating according to the indicators of the search criteria, directs encoding the value of Long Word In 710 according to the selected encoding technique (e.g., via Search Encoder 170 of FIG. 1), and driving onto WLs of the arrays (e.g. as a bias), as conceptually indicated by Word Lines (WLs) 731 and Word Lines (WLs) 732. In the specific example illustrated, each character of the word has five digits, and thus five layers of NAND Array 1 151 (NAND Array 2 152) are activated for searching. The activated layers correspond to Segment 1 Data 741 (Segment 2 Data 742).

As in other search operations, the control agent directs a page buffer sensing BLs of a searched array (using included sense amplifiers) and providing sense results, corresponding to evaluating how Long Word In 710 matches with respect to stored values.

As in FIG. 6, NAND Array 1 151 and NAND Array 2 152 are variously operable in serial or in parallel. Optionally, the search criteria comprise an indicator to perform the search using the serial technique or the parallel technique. Example systems are variously enabled to perform the serial technique, the parallel technique, or both, according to hardware capability.

Similar to FIG. 6, in the serial technique, the control agent directs applying Segment 1 711 of Long Word In 710 to NAND Array 1 151 via Segment 1 721 and Word Lines (WLs) 731 in a first portion of operation. The first page buffer instance provides first sense results to Result Combining+Sequencing 191. Then, the control agent directs applying Segment 2 712 of Long Word In 710 to NAND Array 2 152 via Segment 2 722 and Word Lines (WLs) 732 in a second portion of operation. The second page buffer instance provides second sense results to Result Combining+Sequencing 191. Result Combining+Sequencing 191 is an example of the control agent that controls sequencing relating to the first and second portions of operation. Result Combining+Sequencing 191 combines the first and second sense results to form an overall search result across Segment 1 Data 741 and Segment 2 Data 742 to provide as Results 190.

Similar to FIG. 6, in the parallel technique, the control agent directs applying Segment 1 711 of Long Word In 710 to NAND Array 1 151 (as in the first portion of operation of the serial technique) and in parallel, applying Segment 2 712 of Long Word In 710 to NAND Array 2 152 (as in the second portion of operation of the serial technique). Result Combining+Sequencing 191 is an example of the control agent that controls sequencing relating to the parallel application of Segment 1 711 of Long Word In 710 to NAND Array 1 151 and Segment 2 712 of Long Word In 710 to NAND Array 2 152. Result Combining+Sequencing 191 combines the sense results from the first and second page buffer instances to form an overall search result across Segment 1 Data 741 and Segment 2 Data 742 to provide as Results 190.

Conceptually, the parallel technique enables producing twice as many search results per unit time as the serial technique.

Similar to FIG. 6, FIG. 7 is representative of performing two searches (either via the serial technique or the parallel technique) in a 3D-NAND memory array (NAND Array 1 151 and NAND Array 2 152 collectively). A first segment of data (e.g., Segment 1 Data 741) is stored in a first portion of the 3D-NAND memory array. A second segment of data (e.g., Segment 2 742) is stored in a second portion of the 3D-NAND memory array. The first of the two searches (corresponding to Segment 1 721) is performed using respective BLs and WLs corresponding to the first portion of the 3D-NAND memory array. The second of the two searches (corresponding to Segment 2 722) is performed using respective BLs and WLs corresponding to the second portion of the 3D-NAND memory array. WLs of the first portion of the 3D-NAND array (e.g., the WLs that couple to Segment 1 Data 741 stored in NAND Array 1 151) are separate from the WLs of the second portion of the 3D-NAND array (e.g., the WLs that couple to Segment 2 Data 742 stored in NAND Array 2 152).

Unused layers, unused memory string pairs, and/or unused 2D arrays are operated to effectively be ignored with respect to matching, as described with respect to FIG. 5.

3D-NAND In-Memory Search Scaling-Long Word/Single 3D Array

Figure 8:
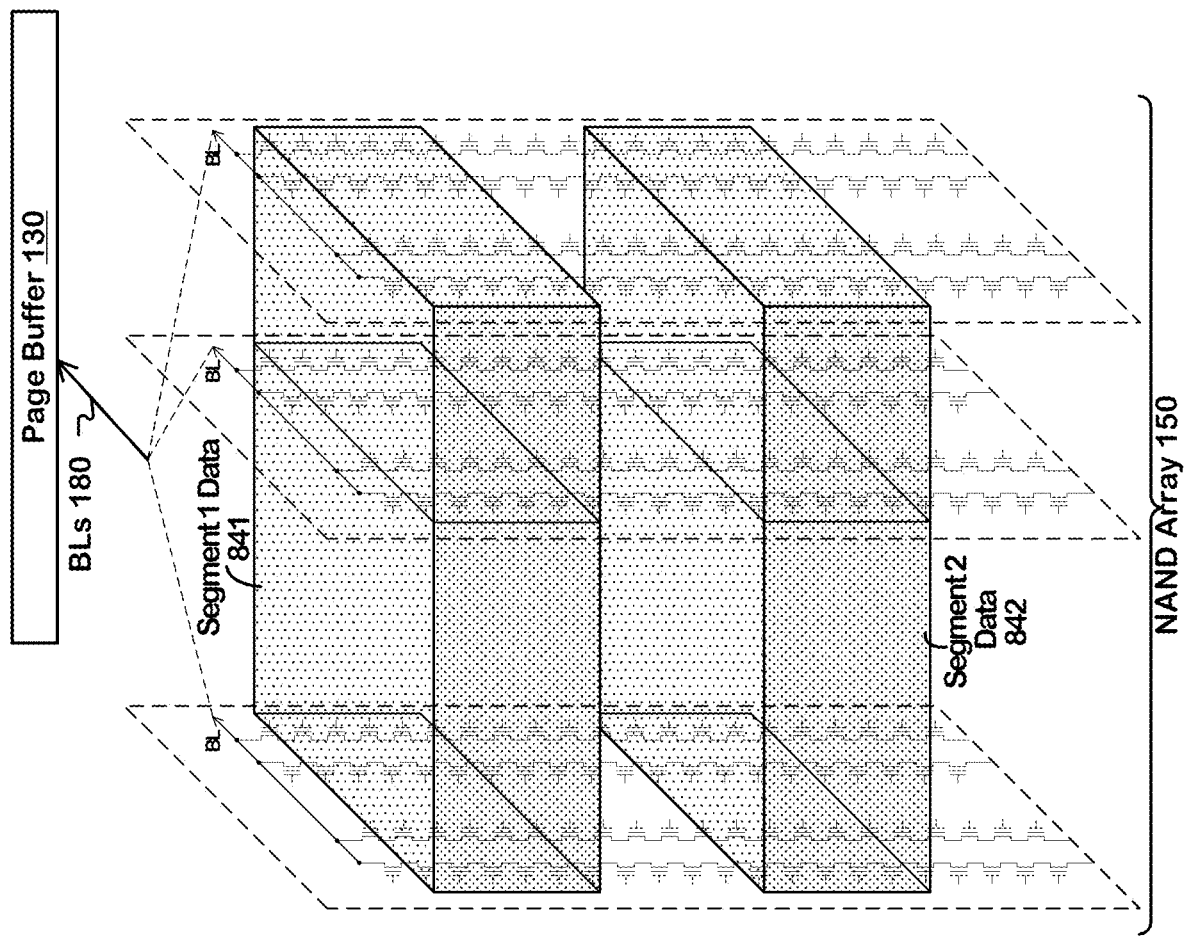
FIG. 8 illustrates techniques for searching for a long word in a plurality of non-contiguous data segments in a single 3D-NAND array.
Figure 8:
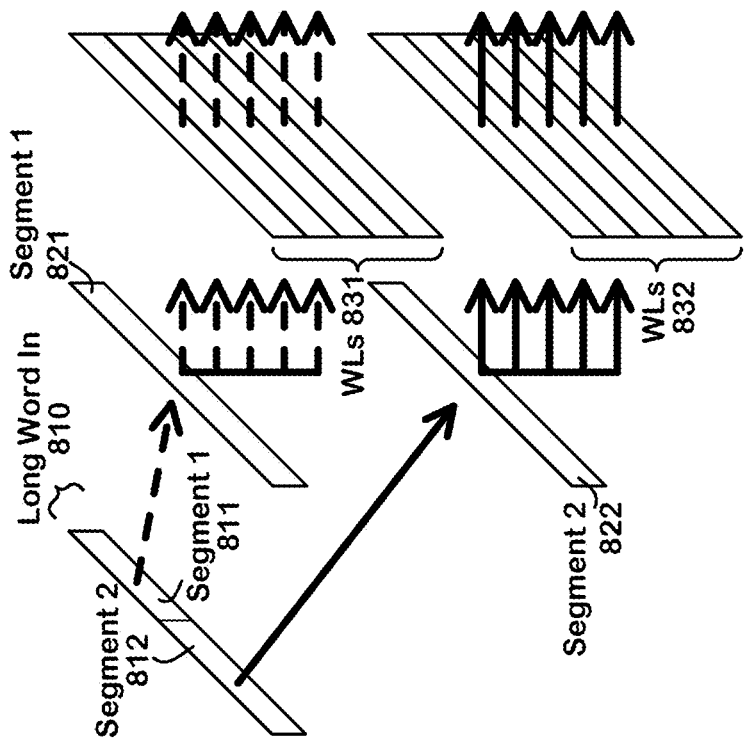

FIG. 8 illustrates techniques for searching for a long word in a plurality of non-contiguous data segments in a single 3D-NAND array. The searching is similar to that of FIG. 7, except a plurality of non-contiguous data segments are stored in a single 3D-NAND array, rather than a plurality of 3D-NAND arrays. Each of the non-contiguous data segments is stored in a corresponding set of layers in the 3D-NAND array. As in FIG. 7, processing is according to a serial technique or a parallel technique. In summary, Long Word In 810 is processed as serially as Segment 1 811 and then Segment 2 812. Segment 1 811 is applied to Segment 1 Data 841 via Segment 1 821 and Word Lines (WLs) 831. Then, Segment 2 812 is applied to Segment 2 Data 842 via Segment 2 822 and Word Lines (WLs) 832. Result Combining+Sequencing 191 controls sequencing (whether serial or parallel) and combines sense results determined from NAND Array 1 151 and NAND Array 2 152 to produce overall search results as Results 190.

The search criteria comprise, for example, an indicator of the search word length (e.g., a number of characters equal to how many memory string pairs are connected to each BL), an indicator that there are five digits per character of the search word, an indicator to search a single NAND array in two segments corresponding to respective segments of the long search word provided via Long Word In 810, an indicator describing where the (non-contiguous) respective segments begin in the single 3D-NAND array, and optionally an indicator to perform the search using the serial technique or the parallel technique.

Unused layers, unused memory string pairs, and/or unused 2D arrays are operated to effectively be ignored with respect to matching, as described with respect to FIG. 5.

Figure 9:
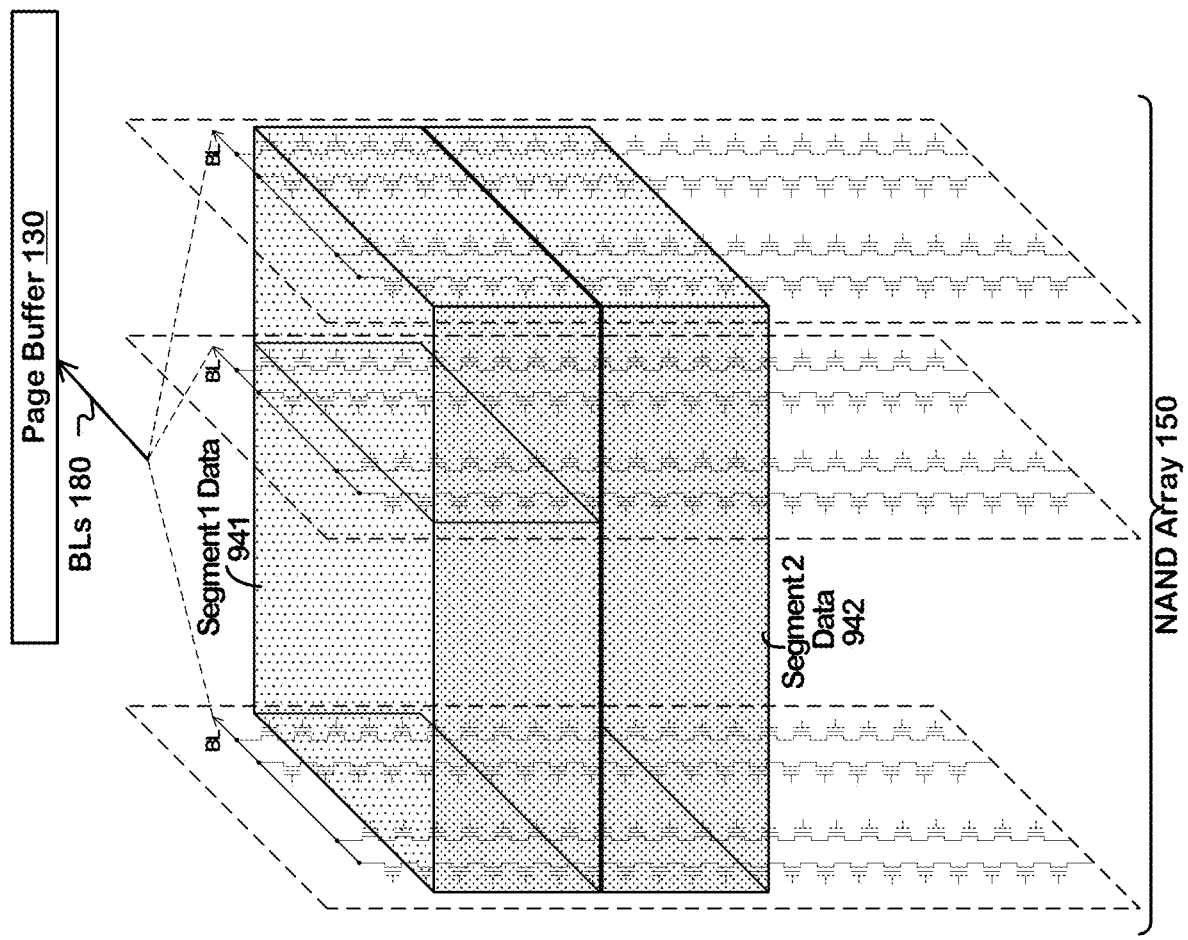
FIG. 9 illustrates techniques for searching for a long word in a plurality of contiguous data segments in a single 3D-NAND array.
Figure 9:
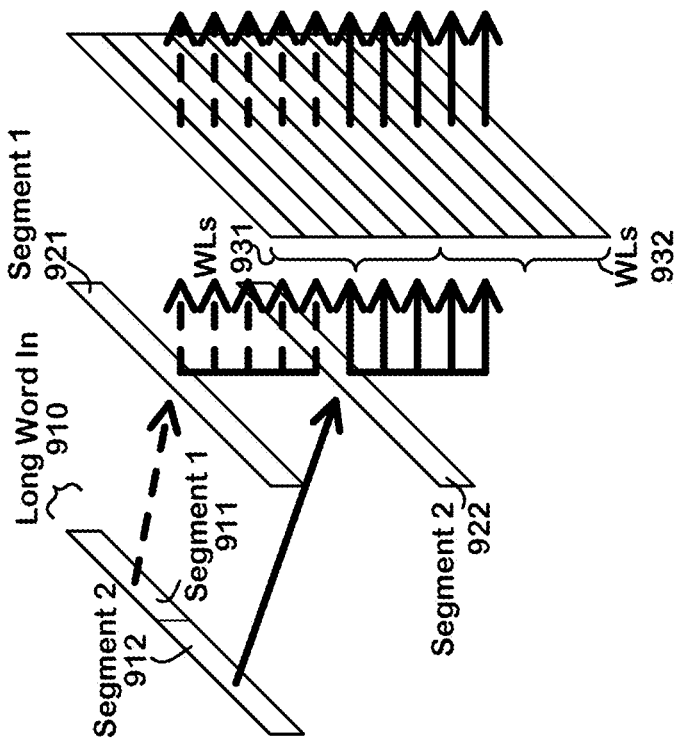

FIG. 9 illustrates techniques for searching for a long word in a plurality of contiguous data segments in a single 3D-NAND array. The searching is similar to that of FIG. 8, except a plurality of contiguous data segments are stored in a single 3D-NAND array, rather than a plurality of non-contiguous data segments stored in a single 3D-NAND array. Each of the contiguous data segments is stored in a corresponding set of layers in the 3D-NAND array. As in FIG. 8, processing is according to a serial technique or a parallel technique. In summary, Long Word In 910 is processed as Segment 1 911 and Segment 2 912. Segment 1 911 is applied to Segment 1 Data 941 via Segment 1 921 and Word Lines (WLs) 931. Segment 2 912 is applied to Segment 2 Data 942 via Segment 2 922 and Word Lines (WLs) 932. Result Combining+Sequencing 191 controls sequencing (whether serial or parallel) and combines sense results determined from NAND Array 1 151 and NAND Array 2 152 to produce overall search results as Results 190.

The search criteria comprise, for example, an indicator of the search word length (e.g., a number of characters equal to twice as many memory string pairs that are connected to each BL), an indicator that there are five digits per character of the search word, an indicator to search a single 3D-NAND array in two segments corresponding to respective segments of the long search word provided via Long Word In 910, an indicator describing where the (contiguous) respective segments begin in the single 3D-NAND array, and optionally an indicator to perform the search using the serial technique or the parallel technique.

With respect to each of FIGS. 7, 8, and 9, each word of each segment has any appropriate number of characters. Assume that a word has L characters. For a first example, consider a long word having 2*L characters. Words of each segment are thus L characters. For second example, consider a long word having L+1 characters. Words of a first segment and words of a second segment are any number of characters that totals L+1.

Unused layers, unused memory string pairs, and/or unused 2D arrays are operated to effectively be ignored with respect to matching, as described with respect to FIG. 5.

3D-NAND In-Memory Search Scaling-Short Word or Small Data Set

Figure 10:
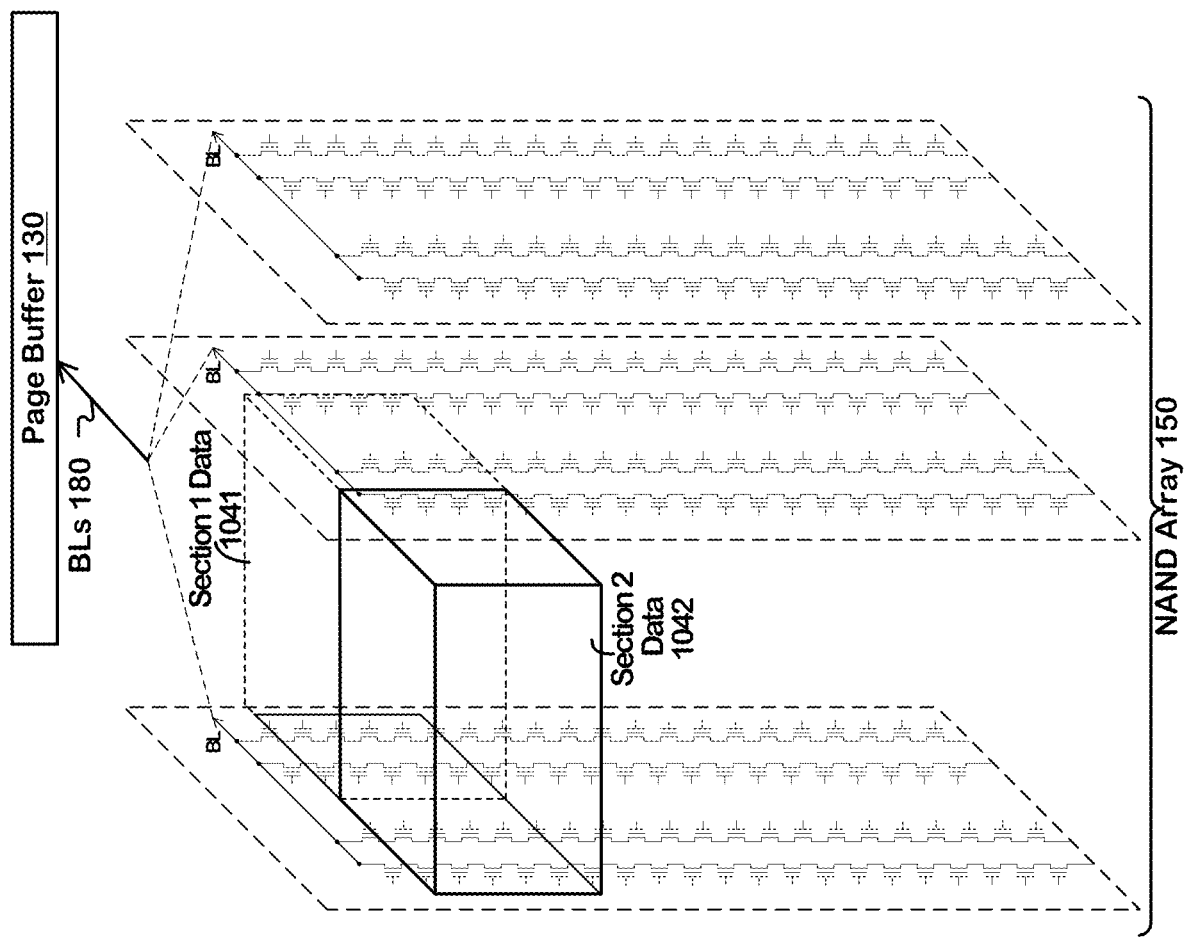
FIG. 10 illustrates techniques for searching for short words or searching within a small data set in a 3D-NAND array.
Figure 10:
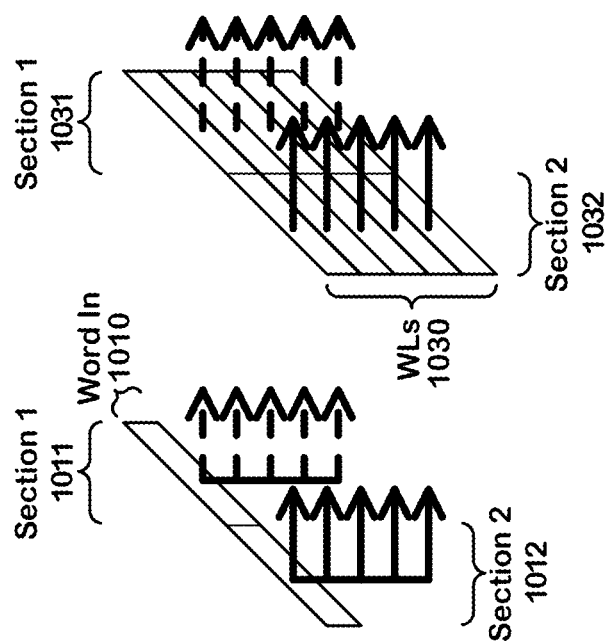

FIG. 10 illustrates techniques for searching for short words or searching within a small data set in a 3D-NAND array. Assume there are L memory string pairs connected to each BL. An example of a short word is a word with fewer than L characters. Thus, a first short word and a second short word are searchable within a same set of 2D arrays if the number of characters in the first and second short words total less than L. An example of a small data set is a data set having data values each with fewer than L characters. Thus, a first small data set and a second small data set are searchable within a same set of 2D arrays if the number of characters in each word of the first and second small data sets total less than L.

The searching is similar to that of FIG. 8, except a plurality of data sections are stored in a single 3D-NAND array. Each of the data sections is stored in a corresponding set of memory string pairs in the 3D-NAND array, such that the sections share BLs. Processing is according to either a single small word at a time or a plurality of small words in parallel with an implicit logical AND operation between each small word search result.

For a first example, a single one of two small words is processed alone, and unused memory string pairs corresponding to the unpressed one of the two small words are disabled via deactivating corresponding SSLs (e.g., via application of zero volts to the corresponding SSLs). Sensed results correspond to the single small word.

For a second example, two small words are processed together, and memory string pairs corresponding to both the small words are enabled via activating corresponding SSLs (e.g., via application of a high voltage to the corresponding SSLs). Sensed results correspond to a logical AND of the sense results of the first small word and the sense results of the second small word.

In summary, Word In 1010 is processed as Section 1 1011 and Section 2 1012. Section 1 1011 is applied to Section 1 Data 1041 via Section 1 1031 of Word Lines (WLs) 1030. Section 2 1012 is applied to Section 2 Data 1042 via Section 2 1032 of Word Lines (WLs) 1030. Result Combining+Sequencing 191 controls sequencing (whether serial or parallel) and combines sense results determined from NAND Array 1 151 and NAND Array 2 152 to produce overall search results as Results 190.

The search criteria comprise, for example, an indicator of the search word length (e.g., a number of characters equal to how many memory string pairs are connected to each BL), an indicator of the length of a section of the search word (e.g., a fraction of the search word length, measured, e.g., in characters), an indicator that there are five digits per character of the search word, an indicator to search a single 3D-NAND array in two sections corresponding to respective sections of the search word provided via Word In 1010, an indicator describing where the (contiguous) respective sections begin in the single 3D-NAND array, an indicator of how many BLs are to be part of the search (e.g., less than all), and optionally an indicator to perform the search one small search word at a time or to perform the search for the two small search words together.

Similar to FIG. 6, FIG. 10 is representative of performing two searches (either via one small search word at a time or two small search words together) in a 3D-NAND memory array (e.g., NAND Array 150). A first section of data (e.g., Section 1 Data 1041) is stored in a first portion of the 3D-NAND memory array. A second section of data (e.g., Section 2 Data 1042) is stored in a second portion of the 3D-NAND memory array. The first of the two searches (corresponding to Section 1 1031) is performed using respective BLs and WLs corresponding to the first portion of the 3D-NAND memory array. The second of the two searches (corresponding to Section 2 1032) is performed using respective BLs and WLs corresponding to the second portion of the 3D-NAND memory array. WLs of the first portion of the 3D-NAND array (e.g., the WLs that couple to Section 1 Data 1041 stored in NAND Array 150) are separate from the WLs of the second portion of the 3D-NAND array (e.g., the WLs that couple to Section 2 Data 1042 stored in NAND Array 150).

Unused layers, unused memory string pairs, and/or unused 2D arrays are operated to effectively be ignored with respect to matching, as described with respect to FIG. 5.

3D-NAND In-Memory Search Scaling-Multiple Words/ Multiple 3D Arrays

Figure 11:
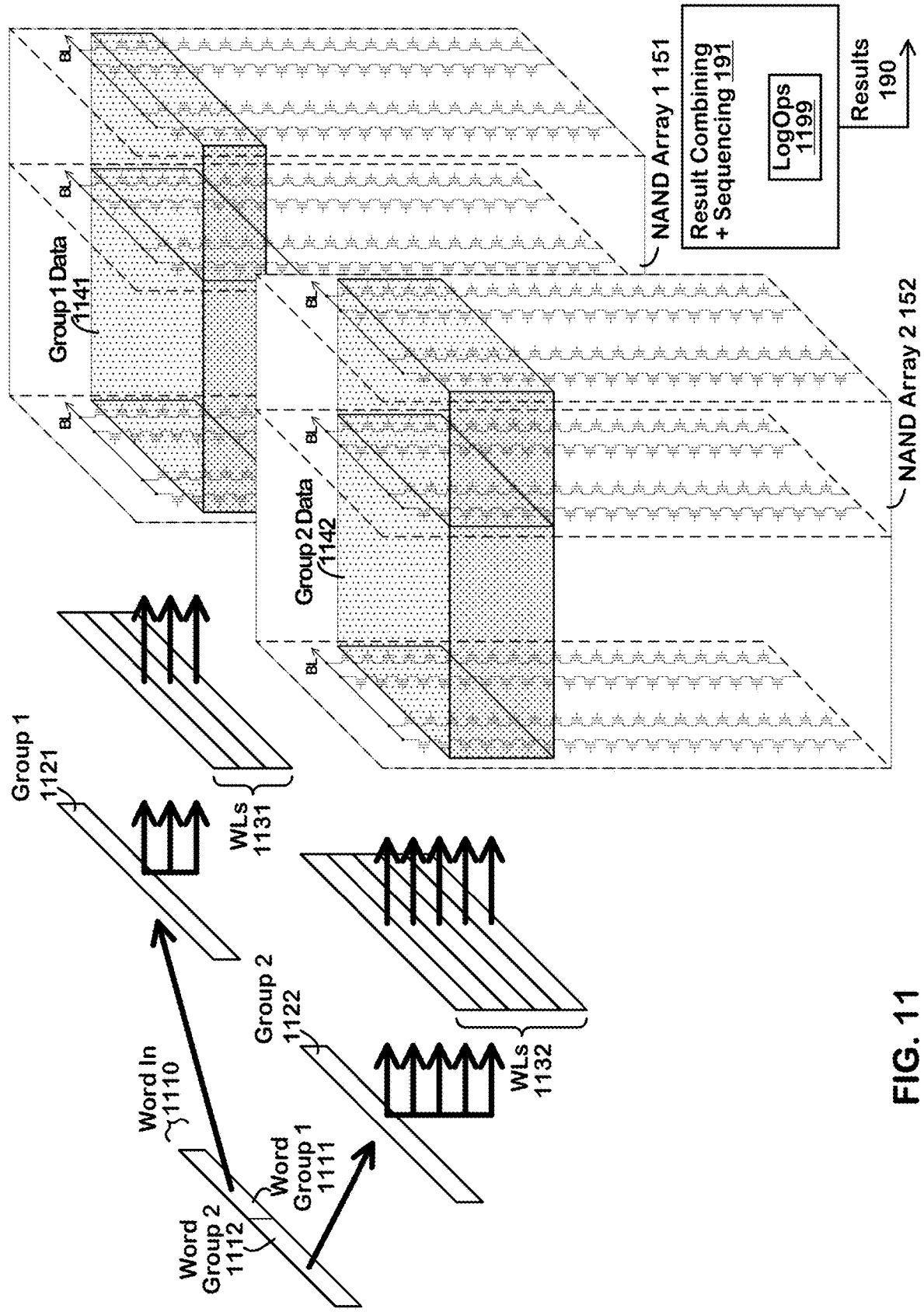
FIG. 11 illustrates techniques for searching for multiple words in parallel in a plurality of 3D-NAND arrays.

FIG. 11 illustrates techniques for searching for multiple words in parallel in a plurality of 3D-NAND arrays. Operation is similar to the parallel processing of two segments of a long word of FIG. 7. However, instead of parallel processing of two segments of a long word, FIG. 11 illustrates parallel processing of two word groups in parallel, with an optional combining logical operation. Examples of the combining logical operation are AND, OR, XOR, XNOR, and other, e.g., two-operand logical operations. Logical Operations 1199 of Result Combining+Sequencing 191 is enabled to perform the combining logical operations. If there is no logical operation, then individual search results are provided for each of the 3D-NAND arrays.

In summary, Word In 1110 is processed as Word Group 1 1111 and Word Group 2 1112. Word Group 1 1111 is applied to Group 1 Data 1141 via Group 1 1121 and Word Lines (WLs) 1131. In parallel, Word Group 2 1112 is applied to Group 2 Data 1142 via Group 2 1122 and Word Lines (WLs) 1132. Result Combining+Sequencing 191 controls parallel sequencing and combines sense results determined from NAND Array 1 151 and NAND Array 2 152 via a logical operation as optionally performed by Logical Operations 1199 to produce overall search results as Results 190.

The search criteria comprise, for example, an indicator of the search word length (e.g., a number of characters equal to how many memory string pairs are connected to each BL), an indicator that there are three digits per character of the first group of the search word, an indicator that there are five digits per character of the second group of the search word, an indicator to search two 3D-NAND arrays for respective groups of the search word, and an indicator of the combining logical operation to perform.

The system enables varying word length (e.g., L), number of digits/layers (e.g., n), and/or base/levels (e.g., m) between the data groups.

Similar to FIG. 6, FIG. 11 is representative of performing two searches in a 3D-NAND memory array (NAND Array 1 151 and NAND Array 2 152 collectively). A first group of data (e.g., Group 1 1141) is stored in a first portion of the 3D-NAND memory array. A second group of data (e.g., Group 2 1142) is stored in a second portion of the 3D-NAND memory array. The first of the two searches (corresponding to Group 1 1121) is performed using respective BLs and WLs corresponding to the first portion of the 3D-NAND memory array. The second of the two searches (corresponding to Group 2 1122) is performed using respective BLs and WLs corresponding to the second portion of the 3D-NAND memory array. WLs of the first portion of the 3D-NAND array (e.g., the WLs that couple to Group 1 Data 1141 stored in NAND Array 1 151) are separate from the WLs of the second portion of the 3D-NAND array (e.g., the WLs that couple to Group 2 Data 1142 stored in NAND Array 2 152).

Unused layers, unused memory string pairs, and/or unused 2D arrays are operated to effectively be ignored with respect to matching, as described with respect to FIG. 5.

3D-NAND In-Memory Search Scaling-Multiple Words/ Single 3D Array

Figure 12A:
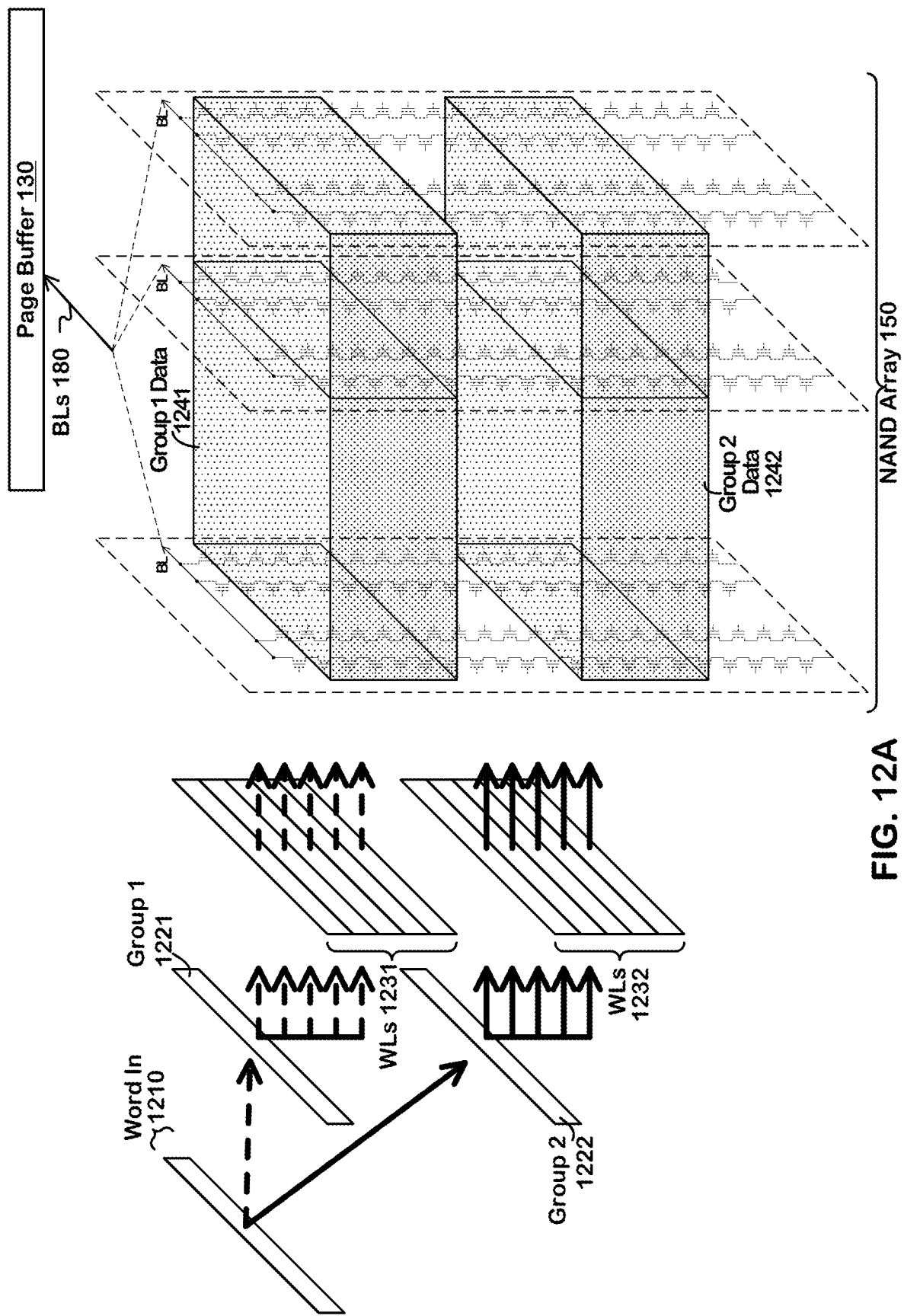
FIGS. 12A and 12B (collectively referred to as FIG. 12) together illustrate techniques for searching among multiple word groups in a single 3D-NAND array.
Figure 12B:
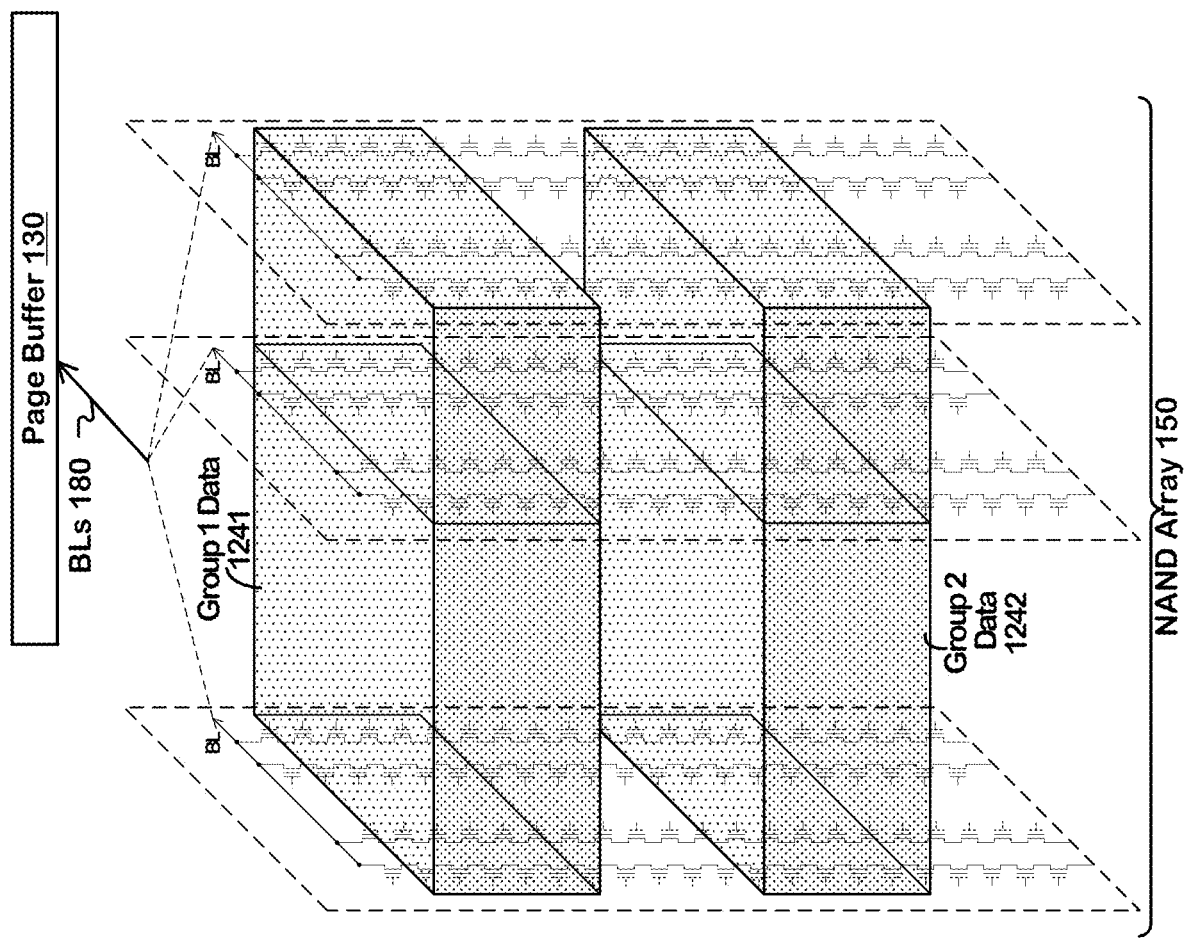
Figure 12B:
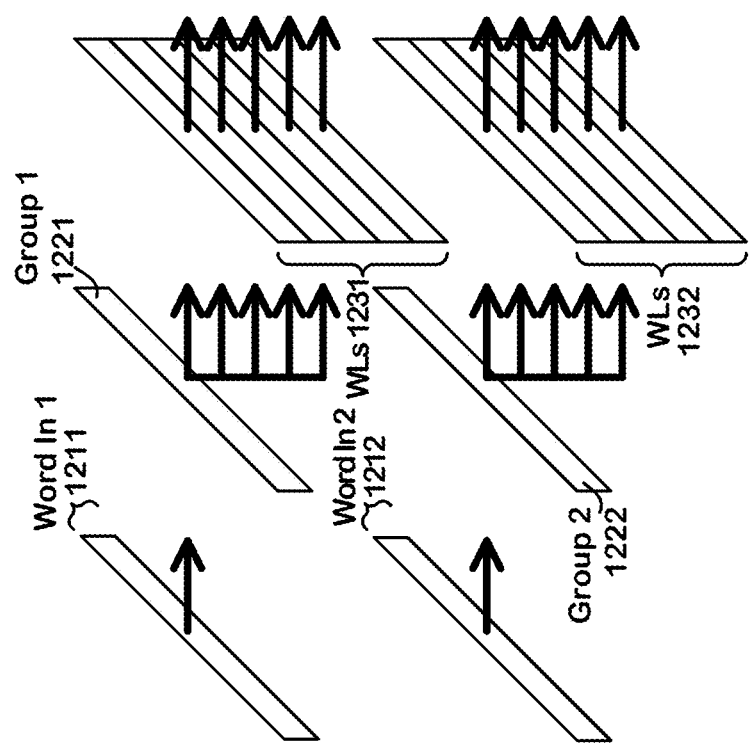

FIGS. 12A and 12B (collectively referred to as FIG. 12) together illustrate techniques for searching among multiple word groups in a single 3D-NAND array. Operation is similar to the processing of two segments of a long word of FIG. 8. However, instead of processing of two segments of a long word, FIGS. 12A and 12B respectively illustrate serial and parallel processing of two word groups. In the parallel processing case, the sense results of the search among the word groups are implicitly combined by a logical AND operation.

In summary, in series operation (FIG. 12A), Word In 1210 is processed serially via Group 1 1221 and Group 2 1222. Word In 1210 is applied to Group 1 Data 1241 via Group 1 1221 and Word Lines (WLs) 1231. Layers of NAND Array 150 other than those of Group 1 Data 1241 are operated to effectively be ignored with respect to matching, such as by applying a passing voltage (e.g., Vpass) to the WLs of the unused layers (such as including layers of Group 2 Data 1242).

Then, Word In 1210 is applied to Group 2 Data 1242 via Group 2 1222 and Word Lines (WLs) 1232. Layers of NAND Array 150 other than those of Group 2 Data 1242 are operated to effectively be ignored with respect to matching, such as by applying a passing voltage (e.g., Vpass) to the WLs of the unused layers (such as including layers of Group 1 Data 1241). Result Combining+Sequencing 191 controls serial sequencing and either serially provides respective sense results determined from NAND Array 1 151 and NAND Array 2 152 as respective search results on Results 190 or parallel provides the respective sense results as search results on Results 190.

In summary, in parallel operation (FIG. 12B), Word In 1 1211 is processed in parallel with Word In 2 1212.

Word In 1 1211 is applied to Group 1 Data 1241 via Group 1 1221 and Word Lines (WLs) 1231. In parallel, Word In 2 1212 is applied to Group 2 Data 1242 via Group 2 1222 and Word Lines (WLs) 1232. Result Combining+Sequencing 191 controls parallel sequencing and provides, on Results 190, search results as determined from a logical AND operation of sense results of NAND Array 1 151 and sense results of NAND Array 2 152.

The search criteria comprise, for example, an indicator of the search word length (e.g., a number of characters equal to how many memory string pairs are connected to each BL), an indicator that there are five digits per character of the search word, an indicator to search a single NAND array in two groups, an indicator describing where the (non-contiguous) respective groups begin in the single 3D-NAND array, and optionally an indicator to perform the search using serial processing or parallel processing.

The system enables varying word length (e.g., L), number of digits/layers (e.g., n), and/or base/levels (e.g., m) between the data groups. For example, with two word groups, one having fewer characters than the other, unused memory devices corresponding to unused characters in NAND Array 150 corresponding to the word group having fewer characters, are programmed to Don't Care values or corresponding WLs are driven to Wildcard bias values.

Unused layers, unused memory string pairs, and/or unused 2D arrays are operated to effectively be ignored with respect to matching, as described with respect to FIG. 5.

3D-NAND In-Memory Search Operation

Figure 13:
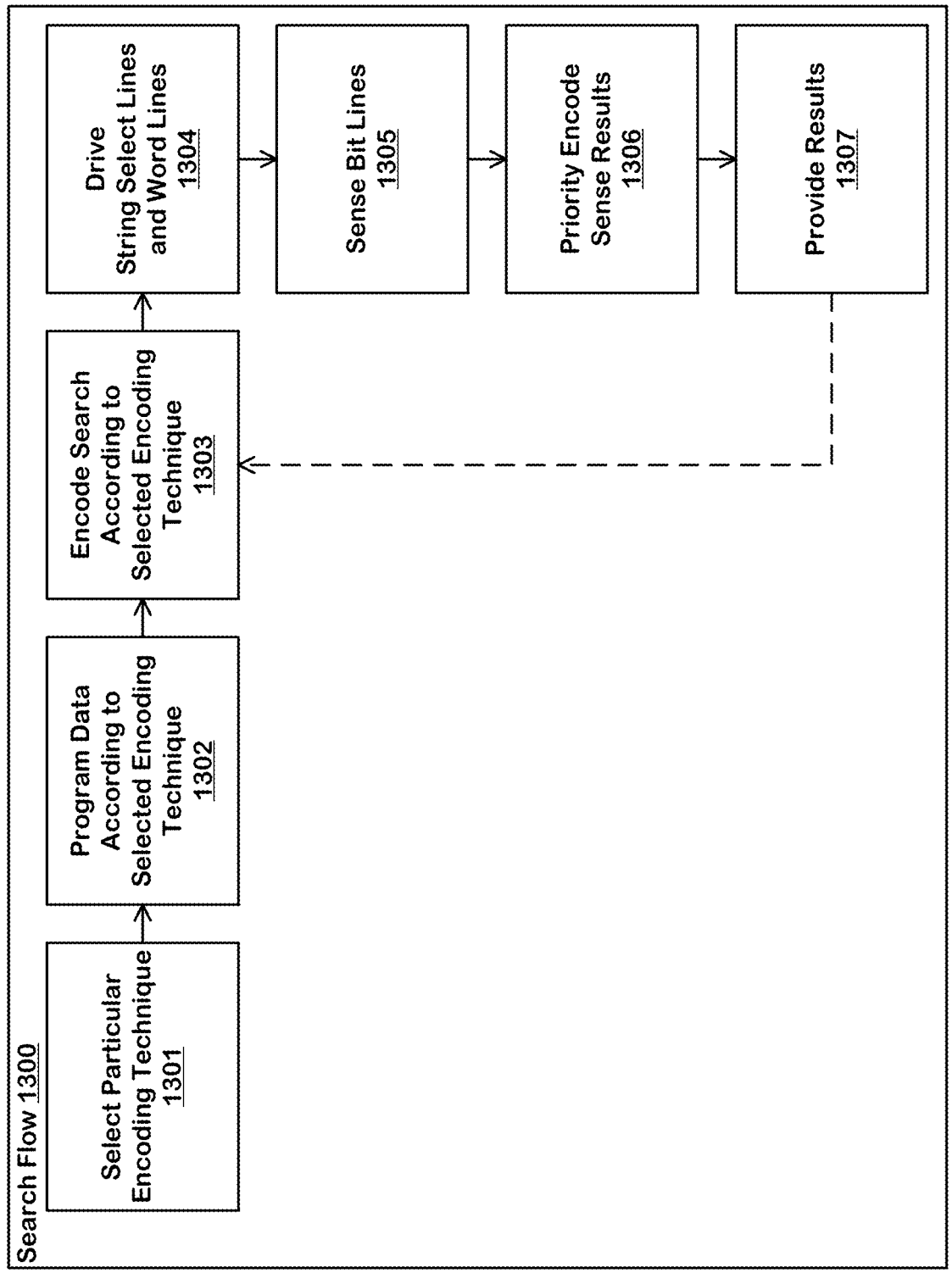
FIG. 13 illustrates an example operating flow for a 3D-NAND in-memory search system.

FIG. 13 illustrates an example operating flow for a 3D-NAND in-memory search system (for example, 3D-NAND In-Memory Search System 100 of FIG. 1A), as Search Flow 1300.

Flow begins at Select Particular Encoding Technique 1301. The particular encoding technique is used for programming data and searching.

Flow then proceeds to Program Data According to Selected Encoding Technique 1302. For example, with respect to FIG. 1, Data Encoder 160 receives Data 110, encodes it according to the particular encoding technique (e.g., as represented by Encoding 140), and provides Encoded Data 111 to NAND Array 150 for programming as stored data to be searched against.

Flow then proceeds to Encode Search According to Selected Encoding Technique 1303. Continuing with the example, Search Encoder 170 receives Search 120, encodes a search value therein according to the particular encoding technique, and provides Word Lines (WLs, WL's) 172 to NAND Array 150 for searching. Search 120 optionally includes one or more indicators of how to perform the search. Search Encoder 170 optionally uses one or more of the indicators to determine which layers to encode the search value with respect to Word Lines (WLs, WL's) 172. Search Encoder 170 selectively "overrides" all or any portions of Word Lines (WLs, WL's) 172 with a voltage to enable passing current in memory strings, irrespective of threshold voltages. Search Encoder 170 selectively determines which SSLs to activate, as provided on String Select Lines (SSLs) 171 to NAND Array 150.

Flow then proceeds to Drive String Select Lines and Word Lines 1304. Continuing with the example, circuitry in Search Encoder 170 and/or NAND Array 150 drives information provided via String Select Lines (SSLs) 171 and Word Lines (WLs, WL's) 172 to SSLs and word lines, respectively, of the 2D memory arrays of NAND Array 150.

Flow then proceeds to Sense Bit Lines 1305. Continuing with the example, circuitry (e.g., one or more sense amplifiers and/or comparators) in NAND Array 150 and/or Page Buffer 130 sense bit lines responsive to driving the SSLs and word lines and subsequent currents on the bit lines as effected by the memory devices.

Flow then proceeds to Priority Encode Sense Results 1306. Continuing with the example, one or more priority encoders of Page Buffer 130 determine, from results of the bit line sensing, which zero or more of the stored data values match as compared to the search value, in accordance with any provided indicators of how to perform the search.

Flow then proceeds to Provide Results 1307. The results are provided, for example, to a host agent as Results 190. Flow then optionally proceeds back to encode a next search (Encode Search According to Selected Encoding Technique 1303).

In serial searches, e.g., that combine one or more sense results determined serially to produce an overall search result (such as described with respect to FIG. 6), one or more of actions 1303, 1304, 1305, and/or 1306 are repeated before action 1307. In parallel searches, e.g., that combine one or more sense results determined in parallel to produce an overall search result (such as described with respect to FIG. 6), one or more of actions 1303, 1304, 13305, and/or 1306 are performed in parallel for one or more search values and/or indicators of how to perform a search.

3D-NAND In-Memory Search In-Memory Search Cell

Figure 14:
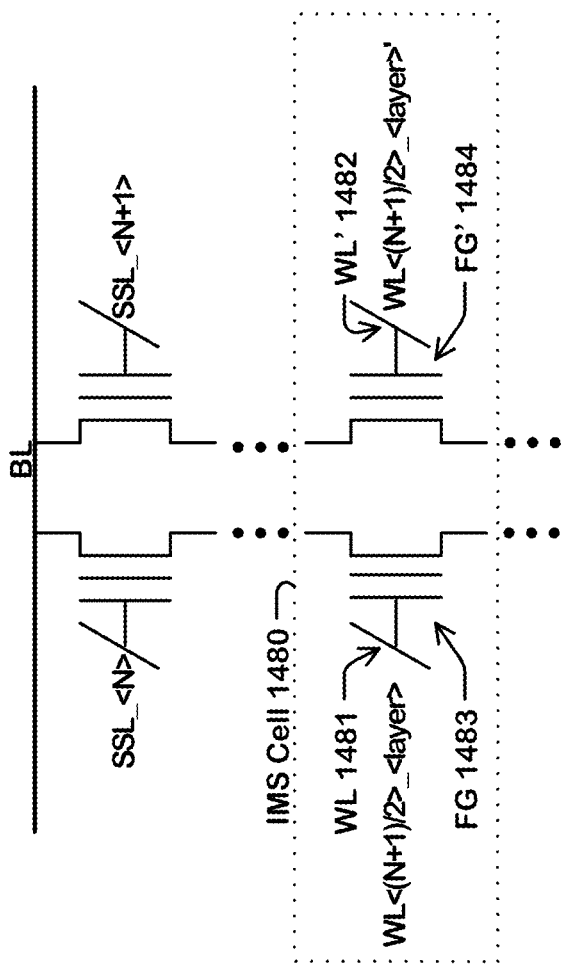
FIG. 14 illustrates in-memory searching in a context of a memory string pair connected to a Bit Line (BL).

FIG. 14 illustrates IMS Cell 1480 in a context of a memory string pair connected to a BL. Floating Gate device (FG) 1483 (of the left-hand memory string of the memory string pair) is connected to Word Line (WL) 1481. Floating Gate device prime (FG') 1484 (of the right-hand memory string of the memory string pair) is connected to Word Line prime (WL') 1482. Floating Gate device (FG) 1483 and Floating Gate device prime (FG') 1484 are programmable, e.g., via adjustment of a threshold voltage via charging/discharging an included floating gate. Thus, Floating Gate device (FG) 1483 and Floating Gate device prime (FG') 1484 are collectively programmable to store various unique symbols referred to as levels.

Figures 15A, 15B:
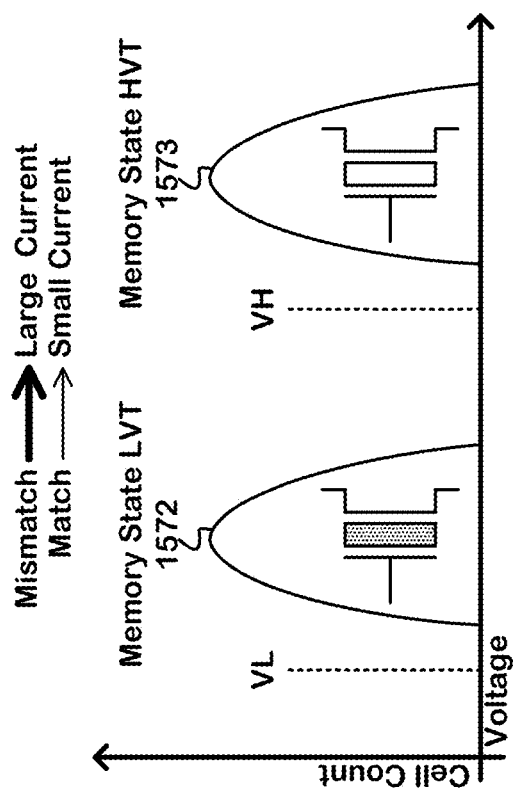
FIGS. 15A and 15B illustrate an example of an encoding technique using two threshold levels and providing a large current indication of a mismatch between search data and stored data.
Figure 18:
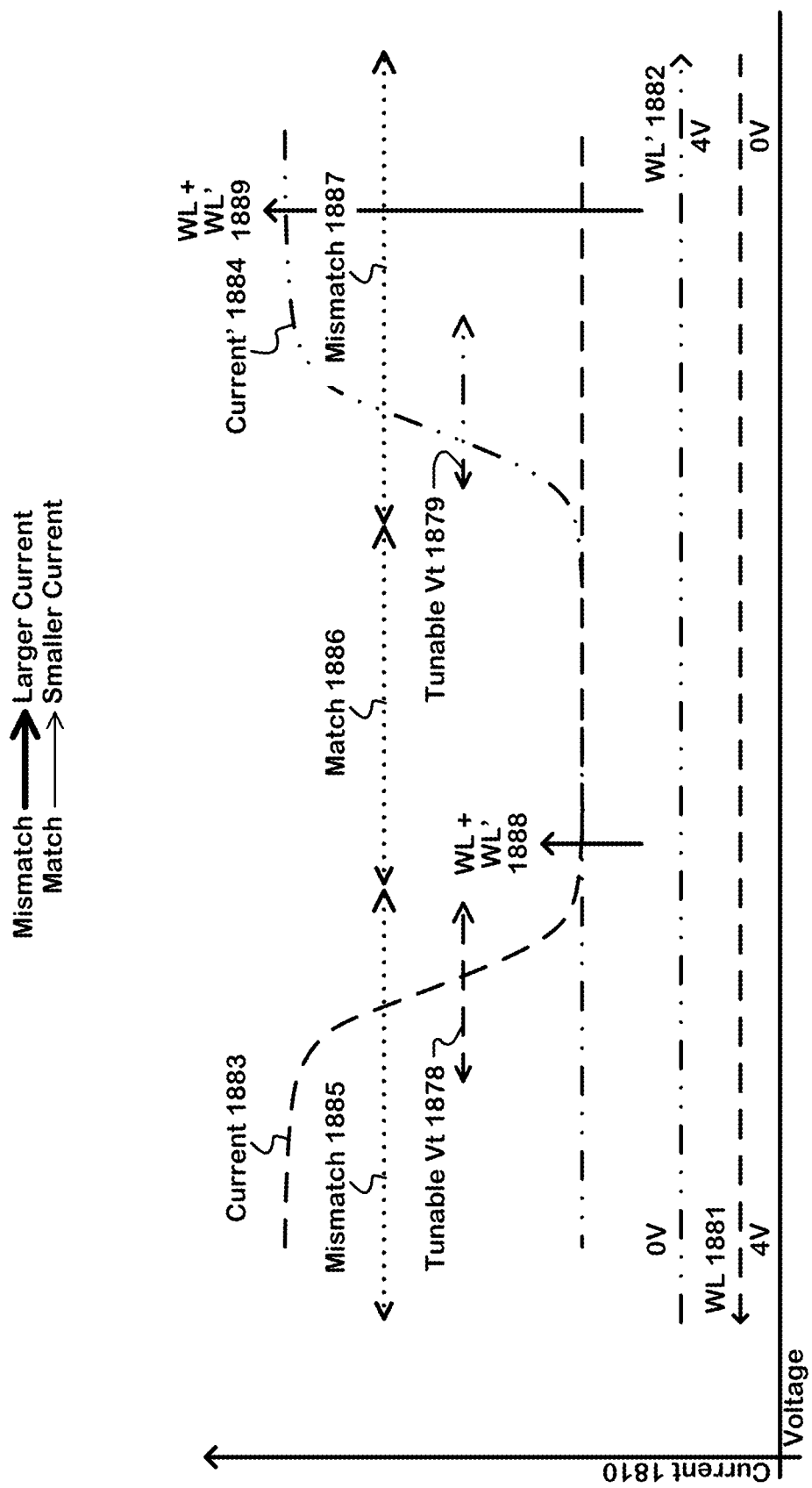
FIG. 18 illustrates an example of an encoding technique using analog levels and providing a larger current indication for mismatches between search data and stored data.
Figures 19A, 19B:
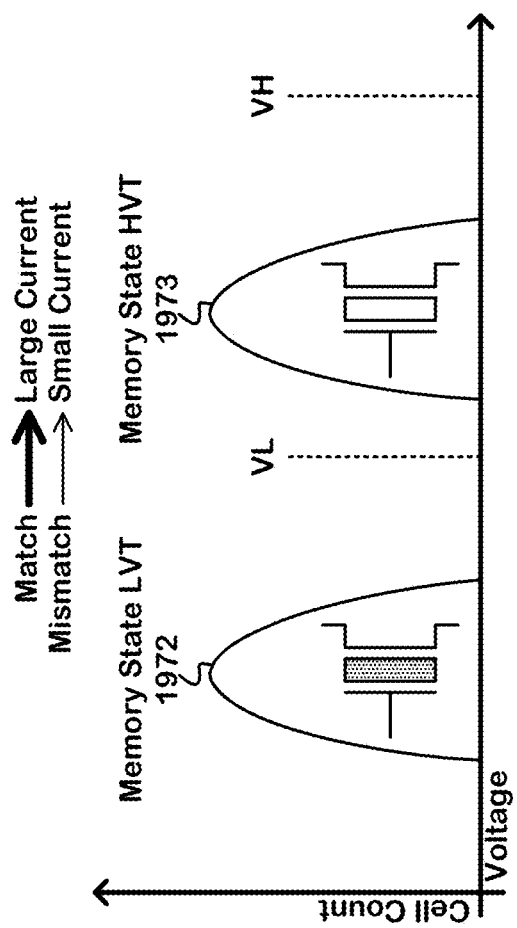
FIGS. 19A and 19B illustrate an example of an encoding technique using two threshold levels and providing a small current as an indication of a mismatch between search data and stored data.
Figures 20A, 20B:
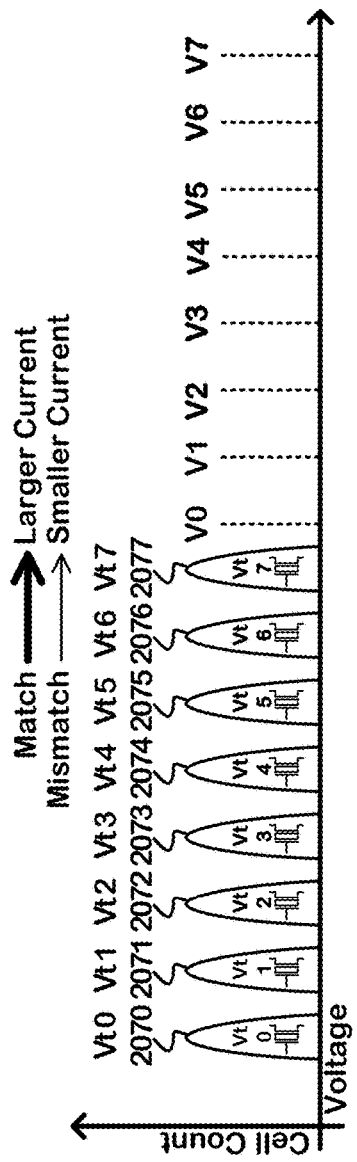
Figure 20C:
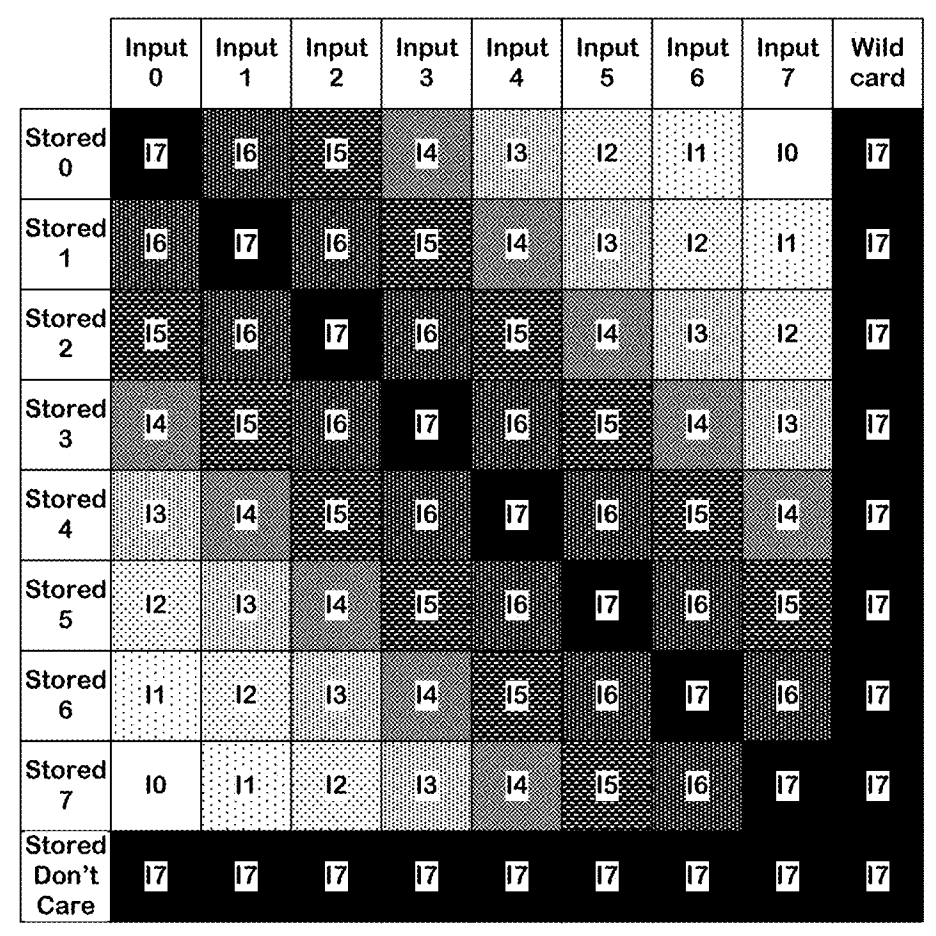
Figures 21A, 21B:
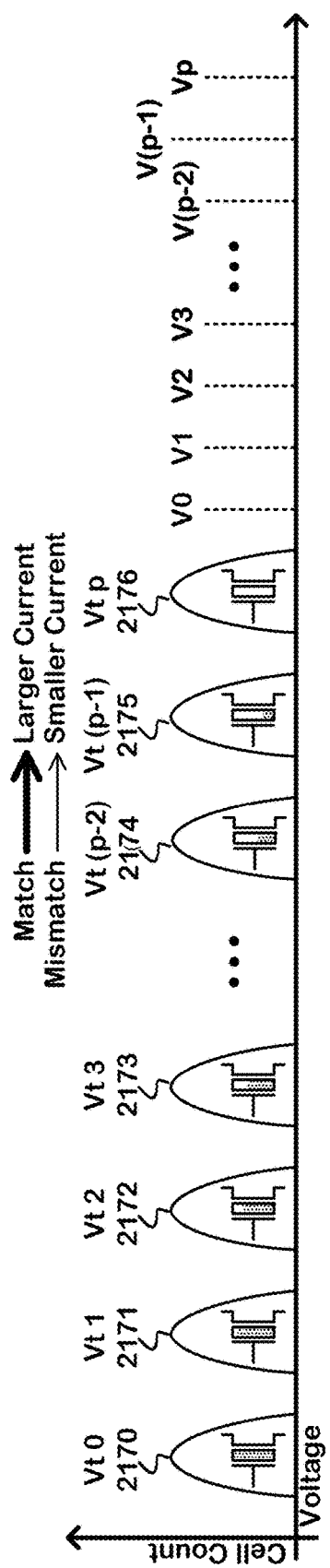
FIGS. 21A and 21B collectively illustrate an example of a p-level encoding technique using p threshold levels and providing a smaller current indication for mismatches between search data and stored data.

For example, FIGS. 15A and 15B as well as FIGS. 19A and 19B illustrate a two-level technique. For another example, FIGS. 16A, 16B, and 16C as well as FIGS. 20A, 20B, and 20C illustrate an eight-level technique. For another example, FIGS. 17A and 17B as well as FIGS. 21A and 21B illustrate a p-level technique. For another example, FIG. 18 illustrates an analog technique.

Each of the two-level, eight-level, p-level, and analog techniques is in accordance with a respective particular encoding technique as implemented by Data Encoder 160 and Search Encoder 170 of FIG. 1.

3D-NAND In-Memory Search Large Mismatch Current

FIGS. 15A and 15B illustrate an example of an encoding technique using two threshold levels and providing a large current indication of a mismatch between search data and stored data. The encoding technique is referred to as a two-threshold large-current-mismatch encoding technique. The figures correspond to a two-threshold large-current-mismatch implementation of IMS Cell 1480 of FIG. 14.

FIG. 15A illustrates the two threshold levels, Memory State LVT 1572 and Memory State HVT 1573. The figure also illustrates a representation of a mismatch between search input and stored data as resulting in a large current through at least one of Floating Gate device (FG) 1483 and Floating Gate device prime (FG') 1484 (of FIG. 14), and a representation of a match between search input and stored data as resulting in a small current through each of Floating Gate device (FG) 1483 and Floating Gate device prime (FG') 1484.

FIG. 15B illustrates search data encoding and stored data encoding according to the two-threshold large-current-mismatch encoding technique.

Figures 16A, 16B:
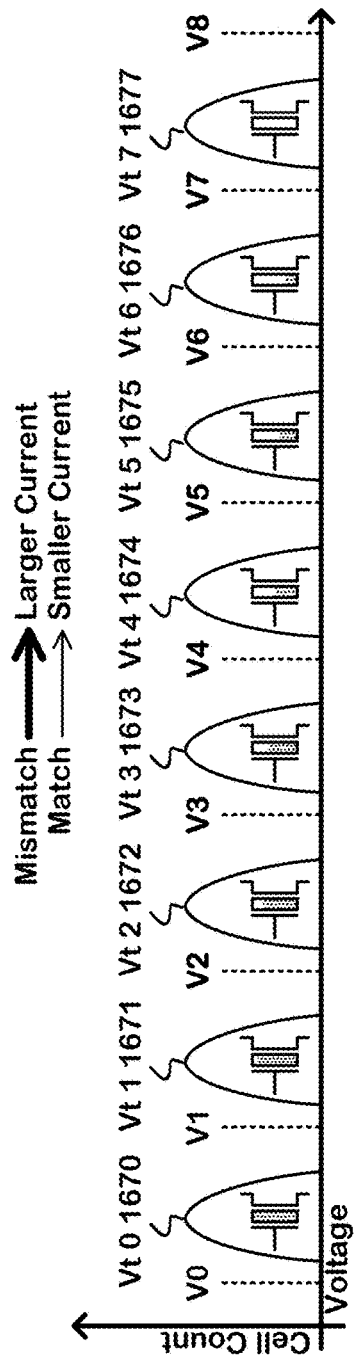

FIGS. 16A, 16B, and 16C collectively illustrate an example of an encoding technique using eight threshold levels and providing a larger current indication for mismatches between search data and stored data. The encoding is referred to as an eight-threshold larger-current-mismatch encoding technique. The figures correspond to an eight-threshold larger-current-mismatch implementation of IMS Cell 1480 of FIG. 14.

FIG. 16A illustrates the eight threshold levels as Vt 1 1671 . . . . Vt 7 1677 and a zero threshold level as Vt 0 1670 as well as corresponding encoding voltages as V0 . . . V8. The figure also illustrates a representation of a mismatch between search input and stored data as resulting in a relatively larger current through at least one of Floating Gate device (FG) 1483 and Floating Gate device prime (FG') 1484 (of FIG. 14), and a representation of a match between search input and stored data as resulting in a relatively smaller current through each of Floating Gate device (FG) 1483 and Floating Gate device prime (FG') 1484.

FIG. 16B illustrates search data encoding and stored data encoding according to the eight-threshold larger-current-mismatch encoding technique.

FIG. 16C illustrates examples of total current through Floating Gate device (FG) 1483 and Floating Gate device prime (FG') 1484 together in various combinations of search input and stored data. Generally darker boxes indicate smaller currents. For example, matches between search input and stored data along the descending diagonal result in the smallest total current, Ioff.

Figures 17A, 17B:
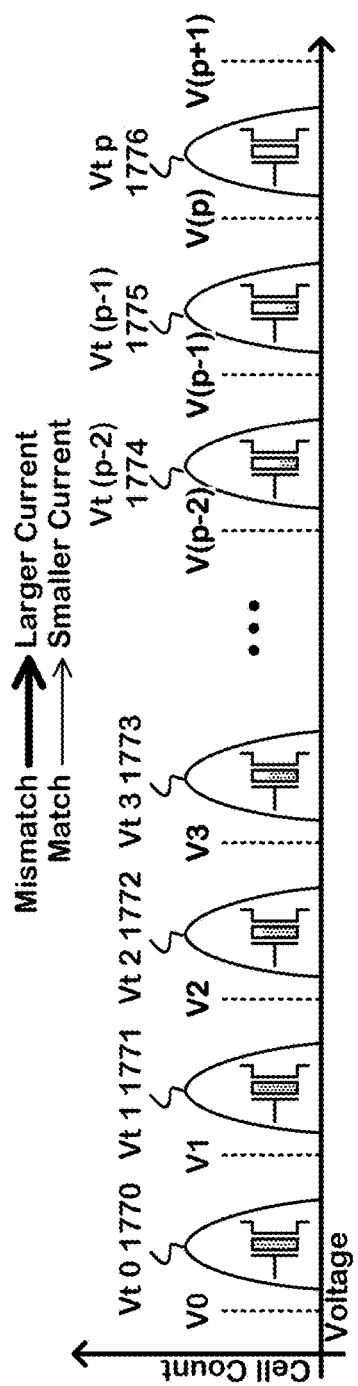
FIGS. 17A and 17B collectively illustrate an example of a p-level encoding technique using p threshold levels and providing a larger current indication for mismatches between search data and stored data.

FIGS. 17A and 17B collectively illustrate an example of a p-level encoding technique using p threshold levels and providing a larger current indication for mismatches between search data and stored data. The encoding is referred to as a p-threshold larger-current-mismatch encoding technique. The figures correspond to a p-threshold larger-current-mismatch implementation of IMS Cell 1480 of FIG. 14. Correspondingly, the figures correspond to a p-level generalization of the 8-level technique of FIGS. 16A, 16B, and 16C.

FIG. 17A illustrates the p threshold levels as Vt 1 1771 . . . . Vtp 1776 and a zero-threshold level as Vt 0 1770 as well as corresponding encoding voltages as V0, V1 . . . . V(p−2), v(p−1), V(p), and V(p+1). The figure also illustrates a representation of a mismatch between search input and stored data as resulting in a relatively larger current through at least one of Floating Gate device (FG) 1483 and Floating Gate device prime (FG') 1484 (of FIG. 14), and a representation of a match between search input and stored data as resulting in a relatively smaller current through each of Floating Gate device (FG) 1483 and Floating Gate device prime (FG') 1484.

FIG. 17B illustrates search data encoding and stored data encoding according to the p-threshold larger-current-mismatch encoding technique.

FIG. 18 illustrates an example of an encoding technique using analog levels and providing a larger current indication for mismatches between search data and stored data. The encoding is referred to as an analog larger-current-mismatch encoding technique. The figure corresponds to an analog larger-current-mismatch implementation of IMS Cell 1480 of FIG. 14.

Current 1810 represents a vertical dimension for memory device source-drain current plotted against a horizontal dimension for memory device control gate voltage. Two plots are illustrated, Current 1883 for the source-drain current of Floating Gate device (FG) 1483 of FIG. 14, and Current' 1884 for Floating Gate device prime (FG') 1484 of FIG. 14. With respect to Floating Gate device (FG) 1483, Current 1883 is the source-drain current as a function of voltage applied to Word Line (WL) 1481 as illustrated by Word Line (WL) 1881 over a range (e.g., 4 to 0 volts). Similarly, with respect to Floating Gate device prime (FG') 1484, Current' 1884 is the source-drain current as a function of voltage applied to Word Line prime (WL') 1482 as illustrated by Word Line prime (WL') 1882 over a range (e.g., 0 to 4 volts).

There are two zones of word line voltages that indicate mismatch between search input and stored data (stored data as indicated by tuned threshold voltage). The first of the two zones, Mismatch 1885, indicates Floating Gate device (FG) 1483 is on, enabling a larger current. The second of the two zones, Mismatch 1887, indicates Floating Gate device prime (FG') 1484 is on, enabling a larger current. A single middle zone indicates a match between search input and stored data. The middle zone, Match 1886, indicates when both Floating Gate device (FG) 1483 and Floating Gate device prime (FG') 1484 are off, resulting in a smaller current.

Thus, WL, WL' 1888 represents a combination of voltages on Word Line (WL) 1481 and Word Line prime (WL') 1482 resulting in smaller current from IMS Cell 1480, indicating a match between search input and stored data. WL, WL' 1889 represents a combination of voltages on Word Line (WL) 1481 and Word Line prime (WL') 1482 resulting in larger current from IMS Cell 1480, indicating a mismatch between search input and stored data.

Floating Gate device (FG) 1483 is illustrated as having a tunable threshold voltage over a range indicated by Tunable Vt 1878. Similarly, Floating Gate device prime (FG') 1484 is illustrated as having a tunable threshold voltage over a range indicated by Tunable Vt 1879. The tunable threshold voltages enable adjusting widths of Mismatch 1885, Match 1886, and Mismatch 1887.

3D-NAND In-Memory Search Small Mismatch Current

FIGS. 19A and 19B illustrate an example of an encoding technique using two threshold levels and providing a small current as an indication of a mismatch between search data and stored data. The encoding technique is referred to as a two-threshold small-current-mismatch encoding technique. The figures correspond to a two-threshold small-current-mismatch implementation of IMS Cell 1480 of FIG. 14.

FIG. 19A illustrates the two threshold levels, Memory State LVT 1972 and Memory State HVT 1973. The figure also illustrates a representation of a mismatch between search input and stored data as resulting in a small current through each of Floating Gate device (FG) 1483 and Floating Gate device prime (FG') 1484 (of FIG. 14), and a representation of a match between search input and stored data as resulting in a large current through at least one of Floating Gate device (FG) 1483 and Floating Gate device prime (FG') 1484.

FIG. 19B illustrates search data encoding and stored data encoding according to the two-threshold small-current-mismatch encoding technique.

FIGS. 20A, 20B, and 20C collectively illustrate an example of an encoding technique using eight threshold levels and providing a smaller current indication for mismatches between search data and stored data. The encoding is referred to as an eight-threshold smaller-current-mismatch encoding technique. The figures correspond to an eight-threshold smaller-current-mismatch implementation of IMS Cell 1480 of FIG. 14.

FIG. 20A illustrates the eight threshold levels as Vt 0 2070 . . . . Vt 7 2077 as well as corresponding encoding voltages V0 . . . V7. The figure also illustrates a representation of a mismatch between search input and stored data as resulting in a relatively smaller current through each of Floating Gate device (FG) 1483 and Floating Gate device prime (FG') 1484 (of FIG. 14), and a representation of a match between search input and stored data as resulting in a relatively larger current through at least one of Floating Gate device (FG) 1483 and Floating Gate device prime (FG') 1484.

FIG. 20B illustrates search data encoding and stored data encoding according to the eight-threshold smaller-current-mismatch encoding technique.

FIG. 20C illustrates examples of total current through Floating Gate device (FG) 1483 and Floating Gate device prime (FG') 1484 together in various combinations of search input and stored data. Generally darker boxes indicate larger currents. For example, matches between search input and stored data along the descending diagonal result in the largest total current, I7.

FIGS. 21A and 21B collectively illustrate an example of a p-level encoding technique using p threshold levels and providing a smaller current indication for mismatches between search data and stored data. The encoding is referred to as a p-threshold smaller-current-mismatch encoding technique. The figures correspond to a p-threshold smaller-current-mismatch implementation of IMS Cell 1480 of FIG. 14. Correspondingly, the figures correspond to a p-level generalization of the 8-level technique of FIGS. 20A, 20B, and 20C.

FIG. 21A illustrates the p threshold levels as illustrated as Vt 1 2171 . . . . Vt p 2176 and a zero threshold level as Vt 0 2170 as well as corresponding encoding voltages as Vt 0 . . . . Vt p. The figure also illustrates a representation of a mismatch between search input and stored data as resulting in a relatively smaller current through each of Floating Gate device (FG) 1483 and Floating Gate device prime (FG') 1484 (of FIG. 14), and a representation of a match between search input and stored data as resulting in a relatively larger current through at least one of Floating Gate device (FG) 1483 and Floating Gate device prime (FG') 1484.

FIG. 21B illustrates search data encoding and stored data encoding according to the p-threshold smaller-current-mismatch encoding technique.

3D-NAND In-Memory Search Additional Information

Example memory technologies applicable to memory arrays of a high-level architecture for 3D-NAND based in-memory search as disclosed herein include floating-gate, split-gate, SONOS, floating dot, DRAM, DRAM-like (e.g., 2T0C), FeFET, and any memory technology compatible with search via word lines and bit lines. Exemplary SONOS memory technology (sometimes referred to as charge trap memory) uses an insulating layer (e.g., of silicon nitride) with traps to capture and retain charge as injected from a channel. Exemplary floating dot memory technology conceptually replaces a floating gate with a floating silicon nanodot or embeds floating silicon nanodots in a polysilicon gate. Exemplary 2T0C memory technology uses parasitic capacitance of a read transistor to store charge rather than an explicit storage capacitor. Exemplary FeFET memory technology uses permanent electrical field polarization of ferroelectric material embedded between a gate and a source-gate conduction region to store information. Example memory structures applicable to a high-level architecture for 3D-NAND based in-memory search include 2D structures (e.g., 2D flash structures) and 3D structures (e.g., 3D flash structures). Example array architectures applicable to a high-level architecture for 3D-NAND based in-memory search include NOR/OR-type array architectures and AND/NAND-type array architectures.

It is understood that the foregoing disclosure presents implementations, variations, embodiments, and examples in an intended illustrative sense rather than in a limiting sense. It is contemplated that modifications and combinations are discernible that will be within the spirit of the disclosure and the scope of the following claims. What is claimed is:

The invention claimed is:

1. An integrated circuit comprising:
 a 3D-NAND memory array comprising a plurality of bit lines coupled to respective sense amplifiers;
 a data encoder enabled to encode data to store in the 3D-NAND memory array in accordance with a particular encoding;
 a search encoder enabled to (i) encode a first search word to produce an encoded first search word that is encoded according to the particular encoding, (ii) encode a second search word to produce an encoded second search word that is encoded according to the particular encoding, and (iii) respectively apply the encoded first search word and the encoded second search word to respective first and second portions of the 3D-NAND memory array; and
 a logic operations module enabled to perform one of a plurality of selectable logical operations;
 wherein the first portion of the 3D-NAND memory array is enabled, responsive to a first portion of data stored therein and further responsive to the encoded first search word, to produce first sense results using a first portion of the respective sense amplifiers,
 wherein the second portion of the 3D-NAND memory array is enabled, responsive to a second portion of data stored therein and further responsive to the encoded second search word, to produce second sense results using a second portion of the respective sense amplifiers, and
 wherein the logic operations module is enabled to process the first sense results and the second sense results according to a selected one of the selectable logic operations.

2. The integrated circuit of claim 1, wherein the plurality of selectable logical operations comprises a logical AND operation, a logical OR operation, a logical XNOR operation, and a logical XOR operation.

3. The integrated circuit of claim 1, wherein the particular encoding is in accordance with using a pair of memory devices of the 3D-NAND memory array to store a digit of a data value of the first portion of data, and further in accordance with using a pair of word lines to apply a digit of the first search word to the pair of memory devices.

4. The integrated circuit of claim 3, wherein the particular encoding is in accordance with representing "0", "1", and "X" states by respective setting of threshold voltages of first and second memory devices of the pair of memory devices.

5. The integrated circuit of claim 3, wherein the particular encoding is in accordance with representing "0", "1", "2", "3", "4", "5", "6", and "7" states by respective setting of threshold voltages of first and second memory devices of the pair of memory devices.

6. The integrated circuit of claim 1, wherein the first search word comprises a plurality of digits, and the search encoder is further enabled to encode the digits of the plurality of digits in correspondence with a plurality of layers the first portion of data is stored in.

7. The integrated circuit of claim 6, wherein the plurality of layers corresponds to one or more planar process layers of the integrated circuit.

8. The integrated circuit of claim 1, wherein word lines of the first portion of the 3D-NAND memory array are separate from word lines of the second portion of the 3D-NAND memory array.

9. The integrated circuit of claim 1, wherein the first search word and the second search word vary according to number of characters, number of digits per character, or both.

10. A method comprising:
 receiving a first search word and a second search word in a 3D-NAND memory;
 searching for the first search word among stored values of the 3D-NAND memory, producing first bit line sense results;
 searching for the second search word among the stored values of the 3D-NAND memory, producing second bit line sense results; and combining the first bit line sense results and the second bit line sense results according to a selected one of a plurality of selectable logical operations, producing overall search results; and wherein the combining is performed using circuitry on a same integrated circuit die that comprises the 3D-NAND memory.

11. The method of claim 10, wherein the plurality of selectable logical operations comprises a logical AND operation, a logical OR operation, a logical XNOR operation, and a logical XOR operation.

12. The method of claim 10, wherein the stored values are encoded according to a particular encoding, the searching for the first search word comprises encoding the first search word according to the particular encoding, and the searching for the second search word comprises encoding the second search word according to the particular encoding.

13. The method of claim 12, wherein the particular encoding is in accordance with using a pair of memory devices of the 3D-NAND memory to store a digit of the stored values, and further in accordance with using a pair of word lines to apply a digit of the first search word to the pair of memory devices.

14. The method of claim 13, wherein the particular encoding is in accordance with representing "0", "1", and "X" states by respective setting of threshold voltages of first and second memory devices of the pair of memory devices.

15. The method of claim 13, wherein the particular encoding is in accordance with representing "0", "1", "2", "3", "4", "5", "6", and "7" states by respective setting of threshold voltages of first and second memory devices of the pair of memory devices.

16. The method of claim 10, wherein the first search word comprises a plurality of digits, and the searching for the first search word comprises searching for each of the digits of the plurality of digits in a respective one of a plurality of layers the stored values of the 3D-NAND memory are organized in.

17. The method of claim 16, wherein the plurality of layers corresponds to one or more planar process layers of an integrated circuit comprising the 3D-NAND memory.

18. The method of claim 10, wherein the searching for the first search word and the searching for the second search word proceed in parallel respectively using a first portion of the 3D-NAND memory and a second portion of the 3D-NAND memory, word lines of the first portion are separate from word lines of the second portion, and bit lines of the first portion are separate from bit lines of the second portion.

19. The method of claim 18, wherein the first search word and the second search word vary according to number of characters, number of digits per character, or both.

20. An integrated circuit comprising:
a first 3D-NAND memory array comprising first bit lines coupled to respective first sense amplifiers and a second 3D-NAND memory array comprising second bit lines coupled to respective second sense amplifiers;
a data encoder enabled to encode data to store in the first 3D-NAND memory array and the second 3D-NAND memory array in accordance with a particular encoding;
a search encoder enabled to (i) encode a first search word to produce an encoded first search word that is encoded according to the particular encoding, (ii) encode a second search word to produce an encoded second search word that is encoded according to the particular encoding, and (iii) respectively apply the encoded first search word and the encoded second search word to the first 3D-NAND memory array and the second 3D-NAND memory array; and
a logic operations module enabled to perform one of a plurality of selectable logical operations;
wherein the first 3D-NAND memory array is enabled, responsive to a first portion of data stored therein and further responsive to the encoded first search word, to produce first sense results using the respective first sense amplifiers,
wherein the second 3D-NAND memory array is enabled, responsive to a second portion of data stored therein and further responsive to the encoded second search word, to produce second sense results using the respective second sense amplifiers, and
wherein the logic operations module is enabled to process the first sense results and the second sense results according to a selected one of the selectable logic operations.

\* \* \* \* \*